US012787045B2

(12) United States Patent
Li et al.

(10) Patent No.: US 12,787,045 B2
(45) Date of Patent: Nov. 3, 2026

(54) RANDOM ACCESS CHANNEL RESOURCE CONFIGURATION FOR DIFFERENT CAPABILITY USER EQUIPMENT

(71) Applicant: QUALCOMM Incorporated, San Diego, CA (US)

(72) Inventors: Qiaoyu Li, Beijing (CN); Iyab Issam Sakhnini, San Diego, CA (US); Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 258 days.

(21) Appl. No.: 18/294,964

(22) PCT Filed: Sep. 15, 2021

(86) PCT No.: PCT/CN2021/118462
§ 371 (c)(1),
(2) Date: Feb. 2, 2024

(87) PCT Pub. No.: WO2023/039742
PCT Pub. Date: Mar. 23, 2023

(65) Prior Publication Data
US 2024/0340960 A1 Oct. 10, 2024

(51) Int. Cl.
*H04W 72/51* (2023.01)
*H04W 24/10* (2009.01)
*H04W 74/0833* (2024.01)

(52) U.S. Cl.
CPC ........... *H04W 72/51* (2023.01); *H04W 24/10* (2013.01); *H04W 74/0833* (2013.01)

(58) Field of Classification Search
CPC . H04W 72/51; H04W 74/0833; H04W 24/10; H04W 8/24; H04W 74/006
See application file for complete search history.

(56) References Cited

U.S. PATENT DOCUMENTS

2012/0236803 A1 9/2012 Vujcic
2020/0374943 A1 11/2020 Sun et al.
2021/0058976 A1 2/2021 Deogun et al.
(Continued)

FOREIGN PATENT DOCUMENTS

CN 111492716 A 8/2020

OTHER PUBLICATIONS

International Search Report and Written Opinion—PCT/CN2021/118462—ISA/EPO—Jun. 16, 2022.
(Continued)

*Primary Examiner* — Congvan Tran
(74) *Attorney, Agent, or Firm* — QUALCOMM Incorporated

(57) ABSTRACT

Methods, systems, and devices for wireless communications are described. A user equipment (UE) may be configured with a random access channel (RACH) resource associated with a capability level of the UE. The capability level-specific RACH resource may overlap one or more other RACH resources. The UE may identify whether the UE is enabled to report capability information or preferences, or both, using the capability level-specific RACH resource based on how the capability level-specific RACH resource overlaps with the one or more other RACH resources.

30 Claims, 18 Drawing Sheets

(56) References Cited

U.S. PATENT DOCUMENTS

| | | | | |
|---|---|---|---|---|
| 2022/0201691 | A1* | 6/2022 | Shi | H04L 5/0053 |
| 2022/0272762 | A1* | 8/2022 | Määttänen | H04W 48/18 |
| 2022/0312502 | A1* | 9/2022 | Kim | H04W 72/044 |
| 2022/0417999 | A1* | 12/2022 | Li | H04W 74/0833 |
| 2023/0072763 | A1* | 3/2023 | Kim | H04W 74/0841 |
| 2024/0292336 | A1* | 8/2024 | Liu | H04B 7/0691 |

OTHER PUBLICATIONS

Moderator (NTT Docomo, Inc.): "FL Summary #1 on RAN1 Aspects for RAN2-Led Features for RedCap", R1-21xxxxx, 3GPP TSG-RAN WG1 Meeting #105-e, e-Meeting, May 10-27, 2021, RedCapR2ledFLS1-v015_Intel_NEC.docx May 19, 2021 (May 19, 2021) the whole document, 9 Pages.

* cited by examiner

RANDOM ACCESS CHANNEL RESOURCE CONFIGURATION FOR DIFFERENT CAPABILITY USER EQUIPMENT

CROSS REFERENCE

The present application is a 371 national stage filing of International PCT Application No. PCT/CN2021/118462 by LI et al. entitled "RANDOM ACCESS CHANNEL RESOURCE CONFIGURATION FOR DIFFERENT CAPABILITY USER EQUIPMENT," filed Sep. 15, 2021, which is assigned to the assignee hereof, and which is expressly incorporated by reference in its entirety herein.

FIELD OF TECHNOLOGY

The following relates to wireless communications, including random access channel resource configuration for different capability user equipment.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless communications system may support multiple different types of UEs, each of which may have different capabilities. In some cases, UEs with different capability levels may be allocated different resource pools. Some techniques for managing different resource allocations associated with different capability levels may be deficient.

SUMMARY

The described techniques relate to improved methods, systems, devices, and apparatuses that support random access channel (RACH) resource configuration for different capability user equipment.

A method for wireless communications at a user equipment (UE) is described. The method may include receiving, from a base station, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level, identifying whether either of the at least two RACH resource allocations is enabled for use by the UE to transmit capability information or repetition preferences, or both, associated with a capability of the UE, and transmitting random access signaling over one or more of the at least two overlapping RACH resource allocations, where whether the random access signaling includes the capability information or repetition preferences, or both, is based on whether the at least two RACH resource allocations are enabled for the UE to transmit the capability information or the repetition preferences, or both.

An apparatus for wireless communications at a UE is described. The apparatus may include a processor, memory coupled with the processor, and instructions stored in the memory. The instructions may be executable by the processor to cause the apparatus to receive, from a base station, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level, identify whether either of the at least two RACH resource allocations is enabled for use by the UE to transmit capability information or repetition preferences, or both, associated with a capability of the UE, and transmit random access signaling over one or more of the at least two overlapping RACH resource allocations, where whether the random access signaling includes the capability information or repetition preferences, or both, is based on whether the at least two RACH resource allocations are enabled for the UE to transmit the capability information or the repetition preferences, or both.

Another apparatus for wireless communications at a UE is described. The apparatus may include means for receiving, from a base station, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level, means for identifying whether either of the at least two RACH resource allocations is enabled for use by the UE to transmit capability information or repetition preferences, or both, associated with a capability of the UE, and means for transmitting random access signaling over one or more of the at least two overlapping RACH resource allocations, where whether the random access signaling includes the capability information or repetition preferences, or both, is based on whether the at least two RACH resource allocations are enabled for the UE to transmit the capability information or the repetition preferences, or both.

A non-transitory computer-readable medium storing code for wireless communications at a UE is described. The code may include instructions executable by a processor to receive, from a base station, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level, identify whether either of the at least two RACH resource allocations is enabled for use by the UE to transmit capability information or repetition preferences, or both, associated with a capability of the UE, and transmit random access signaling over one or more of the at least two overlapping RACH resource allocations, where whether the random access signaling includes the capability information or repetition preferences, or both, is based on whether the at least two RACH resource allocations are enabled for the UE to transmit the capability information or the repetition preferences, or both.

Some examples of the method, apparatuses, and non-transitory computer-readable medium described herein may further include operations, features, means, or instructions for receiving an indication enabling the second RACH resource allocation associated with the first capability level, where the capability of the UE may be the first capability level, and where the first capability level may be a reduced capability UE capability level.

Some examples of the method, apparatuses, and non-transitory computer-readable medium described herein may further include operations, features, means, or instructions for identifying the overlapping portion of allocations may be a partial overlap between the first RACH resource allocation associated with the basic UE capability level and the second RACH resource allocation associated with the reduced capability UE capability level, where the random access signaling may be transmitted on a non-overlapping portion of the second RACH resource allocation and includes the capability information.

Some examples of the method, apparatuses, and non-transitory computer-readable medium described herein may further include operations, features, means, or instructions for identifying the overlapping portion of allocations may be a partial overlap between the third RACH resource allocation associated with the second capability level or repetition preferences, or both, and the second RACH resource allocation associated with the reduced capability UE capability level.

Some examples of the method, apparatuses, and non-transitory computer-readable medium described herein may further include operations, features, means, or instructions for transmitting the random access signaling including the capability information on the overlapping portion based on the overlapping portion being enabled for reduced capability UE capability reporting.

Some examples of the method, apparatuses, and non-transitory computer-readable medium described herein may further include operations, features, means, or instructions for transmitting the random access signaling including the capability information on a non-overlapping portion of the second RACH resource allocation for associated with the reduced capability UE capability level based on the overlapping portion being disabled for reduced capability UE capability reporting.

Some examples of the method, apparatuses, and non-transitory computer-readable medium described herein may further include operations, features, means, or instructions for identifying the overlapping portion of allocations based on the third RACH resource allocation associated with the second capability level or repetition preferences, or both, being a subset of the second RACH resource allocation associated with the reduced UE capability level and transmitting the random access signaling including the capability information on a non-overlapping portion of the second RACH resource allocation associated with the reduced capability UE capability level based on the third RACH resource allocation being enabled for capability information or repetition preferences reporting for the second capability level or repetition preferences, or both.

Some examples of the method, apparatuses, and non-transitory computer-readable medium described herein may further include operations, features, means, or instructions for identifying the overlapping portion of allocations based on the third RACH resource allocation associated with the second capability level or repetition preferences, or both, being a subset of the second RACH resource allocation associated with the reduced capability UE capability level and transmitting the random access signaling including the capability information on a non-overlapping portion of the second RACH resource allocation associated with the reduced capability UE capability level or on the overlapping portion based on the third RACH resource allocation being disabled for capability information or repetition preference reporting for the second capability level or repetition preferences, or both.

Some examples of the method, apparatuses, and non-transitory computer-readable medium described herein may further include operations, features, means, or instructions for receiving an indication enabling the third RACH resource allocation associated with the second capability level or repetition preferences, or both, where the second RACH resource allocation at least partially overlaps the third RACH resource allocation, the UE may be additionally associated with the second capability level or repetition preferences, or both, and the second capability level or repetition preferences may be a coverage enhancement UE capability level or repetition preferences level.

In some examples of the method, apparatuses, and non-transitory computer-readable medium described herein, transmitting the random access signaling may include operations, features, means, or instructions for transmitting the random access signaling including the capability information or the repetition preferences, or both, associated with the coverage enhancement UE capability level or repetition preferences level based on the second RACH resource allocation associated with the reduced capability UE capability level being a subset of the third RACH resource allocation associated with the coverage enhancement UE capability level or repetition preferences level.

In some examples of the method, apparatuses, and non-transitory computer-readable medium described herein, transmitting the random access signaling may include operations, features, means, or instructions for transmitting the random access signaling including the capability information associated with the reduced capability UE capability level based on the third RACH resource allocation associated with the coverage enhancement UE capability level or repetition preferences level being a subset of the second RACH resource allocation associated with the reduced capability UE capability level.

In some examples of the method, apparatuses, and non-transitory computer-readable medium described herein, transmitting the random access signaling may include operations, features, means, or instructions for transmitting the random access signaling to indicate the capability information including a reduced bandwidth capability, a reduced receive antenna number capability, a reduced receiver antenna gain capability, a reduced number of receive chain capability, a reduced hybrid automatic repeat request (HARQ) processing capability, a reduced channel state information (CSI) processing capability, a reduced beam measurement or reporting capability, a half-duplex frequency division duplexing capability, or any combination thereof.

Some examples of the method, apparatuses, and non-transitory computer-readable medium described herein may further include operations, features, means, or instructions for identifying that capability reporting associated with the first capability level may be disabled for the second RACH resource allocation, where the random access signaling may be transmitted without the capability information.

Some examples of the method, apparatuses, and non-transitory computer-readable medium described herein may further include operations, features, means, or instructions for receiving, from the base station, an indication that the capability reporting associated with the first capability level may be disabled.

In some examples of the method, apparatuses, and non-transitory computer-readable medium described herein, the identifying may include operations, features, means, or instructions for identifying the second RACH resource allocation associated with the first capability level may be a subset of the first RACH resource allocation associated with the basic UE capability level.

In some examples of the method, apparatuses, and non-transitory computer-readable medium described herein, the identifying may include operations, features, means, or instructions for identifying the second RACH resource allocation associated with the first capability level may be a subset of the third RACH resource allocation associated with the second capability level or repetition preferences, or both.

Some examples of the method, apparatuses, and non-transitory computer-readable medium described herein may further include operations, features, means, or instructions for receiving an indication enabling the third RACH resource allocation associated with the second capability level or repetition preferences, or both, where the UE may be associated with the second capability level or repetition preferences, or both, and where the second capability level may be associated with a coverage enhancement UE capability level or repetition preferences level.

Some examples of the method, apparatuses, and non-transitory computer-readable medium described herein may further include operations, features, means, or instructions for identifying the overlapping portion of allocations may be a partial overlap between the first RACH resource allocation associated with the basic UE capability level and the third RACH resource allocation associated with the coverage enhancement UE capability level or repetition preferences level, where the random access signaling may be transmitted on a non-overlapping portion of the third RACH resource allocation and includes the capability information or the repetition preferences, or both.

Some examples of the method, apparatuses, and non-transitory computer-readable medium described herein may further include operations, features, means, or instructions for identifying the overlapping portion of allocations may be a partial overlap between the third RACH resource allocation associated with the coverage enhancement UE capability level or repetition preferences level and the second RACH resource allocation associated with the first capability level.

Some examples of the method, apparatuses, and non-transitory computer-readable medium described herein may further include operations, features, means, or instructions for transmitting the random access signaling including the capability information or repetition preferences, or both, on the overlapping portion based on the overlapping portion being enabled for coverage enhancement UE reporting or repetition preferences reporting.

Some examples of the method, apparatuses, and non-transitory computer-readable medium described herein may further include operations, features, means, or instructions for transmitting the random access signaling including the capability information or repetition preferences, or both, on a non-overlapping portion of the third RACH resource allocation for associated with the coverage enhancement UE capability level or repetition preferences level based on the overlapping portion being disabled for coverage enhancement UE capability reporting or repetition preferences reporting.

Some examples of the method, apparatuses, and non-transitory computer-readable medium described herein may further include operations, features, means, or instructions for identifying the overlapping portion of allocations based on the second RACH resource allocation associated with the first capability level being a subset of the third RACH resource allocation associated with the coverage enhancement capability level or repetition preferences level and transmitting the random access signaling including the capability information or the repetition preferences, or both, on a non-overlapping portion of the third RACH resource allocation associated with the coverage enhancement UE capability level or repetition preferences level based on the second RACH resource allocation associated with the first capability level being enabled for capability reporting.

Some examples of the method, apparatuses, and non-transitory computer-readable medium described herein may further include operations, features, means, or instructions for identifying the overlapping portion of allocations based on the second RACH resource allocation associated with the first capability level being a subset of the third RACH resource allocation associated with the coverage enhancement UE capability level or repetition preferences level and transmitting the random access signaling including the capability information or repetition preferences, or both, on a non-overlapping portion of the third RACH resource allocation associated with the coverage enhancement UE capability level or repetition preferences level or on the overlapping portion based on the second RACH resource allocation being disabled for capability reporting.

In some examples of the method, apparatuses, and non-transitory computer-readable medium described herein, transmitting the random access signaling may include operations, features, means, or instructions for transmitting the random access signaling indicating the capability information or repetition preferences, or both, including one or more of a message 2 physical downlink control channel (PDCCH) or physical downlink shared channel (PDSCH) repetition capability, a message 2 PDCCH or PDSCH repetition preference, a message 2 PDCCH or PDSCH repetition number preference, a message 3 physical uplink shared channel (PUSCH) repetition capability, a message 3 PUSCH repetition preference, a message 3 PUSCH repetition number preference, a message 4 PDCCH or PDSCH or physical uplink control channel (PUCCH) repetition capability, a message 4 PDCCH or PDSCH or PUCCH repetition preference, or a message 4 PDCCH or PDSCH or PUCCH repetition number preference.

Some examples of the method, apparatuses, and non-transitory computer-readable medium described herein may further include operations, features, means, or instructions for identifying that the capability information and the repetition preference reporting associated with the second capability level or repetition preferences, or both, may be disabled for the third RACH resource allocation, where the random access signaling may be transmitted without the capability information or the repetition preferences.

Some examples of the method, apparatuses, and non-transitory computer-readable medium described herein may further include operations, features, means, or instructions for receiving, from the base station, an indication that capability or preference reporting associated with the second capability level or repetition preferences, or both, may be disabled.

In some examples of the method, apparatuses, and non-transitory computer-readable medium described herein, the identifying may include operations, features, means, or instructions for identifying the third RACH resource allocation associated with the second capability level or repetition preferences, or both, may be a subset of the first RACH resource allocation associated with the basic UE capability level.

In some examples of the method, apparatuses, and non-transitory computer-readable medium described herein, the identifying may include operations, features, means, or instructions for identifying the third RACH resource allocation associated with the second capability level or repetition preferences, or both, may be a subset of the second RACH resource allocation associated with the first capability level.

In some examples of the method, apparatuses, and non-transitory computer-readable medium described herein, receiving the control signaling may include operations, features, means, or instructions for receiving an indication of a first set of RACH occasions for a first of the at least two RACH resource allocations and a second set of RACH occasions for a second of the at least two RACH resource allocations, where the first set of RACH occasions and the second set of RACH occasions include one or more common RACH occasions.

In some examples of the method, apparatuses, and non-transitory computer-readable medium described herein, receiving the control signaling may include operations, features, means, or instructions for receiving an indication of a first set of RACH preambles for a first of the at least two RACH resource allocations and a second set of RACH preambles for a second of the at least two RACH resource allocations, where the first set of RACH preambles and the second set of RACH preambles include one or more common RACH occasions.

In some examples of the method, apparatuses, and non-transitory computer-readable medium described herein, the basic UE capability level may be associated with UEs that do not report the first capability level or the second capability level or the repetition preferences, or any combination thereof.

A method for wireless communications at a base station is described. The method may include transmitting, to a UE, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level, identifying whether either of the at least two RACH resource allocations is enabled for use by the UE to transmit capability information or repetition preferences, or both, associated with a capability of the UE, and receiving random access signaling over one or more of the at least two overlapping RACH resource allocations, where whether the random access signaling includes the capability information or repetition preferences, or both, is based on whether the at least two RACH resource allocations are enabled for the UE to transmit capability information or repetition preferences, or both.

An apparatus for wireless communications at a base station is described. The apparatus may include a processor, memory coupled with the processor, and instructions stored in the memory. The instructions may be executable by the processor to cause the apparatus to transmit, to a UE, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level, identify whether either of the at least two RACH resource allocations is enabled for use by the UE to transmit capability information or repetition preferences, or both, associated with a capability of the UE, and receive random access signaling over one or more of the at least two overlapping RACH resource allocations, where whether the random access signaling includes the capability information or repetition preferences, or both, is based on whether the at least two RACH resource allocations are enabled for the UE to transmit capability information or repetition preferences, or both.

Another apparatus for wireless communications at a base station is described. The apparatus may include means for transmitting, to a UE, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level, means for identifying whether either of the at least two RACH resource allocations is enabled for use by the UE to transmit capability information or repetition preferences, or both, associated with a capability of the UE, and means for receiving random access signaling over one or more of the at least two overlapping RACH resource allocations, where whether the random access signaling includes the capability information or repetition preferences, or both, is based on whether the at least two RACH resource allocations are enabled for the UE to transmit capability information or repetition preferences, or both.

A non-transitory computer-readable medium storing code for wireless communications at a base station is described. The code may include instructions executable by a processor to transmit, to a UE, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level, identify whether either of the at least two RACH resource allocations is enabled for use by the UE to transmit capability information or repetition preferences, or both, associated with a capability of the UE, and receive random access signaling over one or more of the at least two overlapping RACH resource allocations, where whether the random access signaling includes the capability information or repetition preferences, or both, is based on whether the at least two RACH resource allocations are enabled for the UE to transmit capability information or repetition preferences, or both.

Some examples of the method, apparatuses, and non-transitory computer-readable medium described herein may further include operations, features, means, or instructions for transmitting an indication enabling the second RACH resource allocation associated with the first capability level, where the capability of the UE may be the first capability level, and where the first capability level may be a reduced capability UE capability level.

Some examples of the method, apparatuses, and non-transitory computer-readable medium described herein may further include operations, features, means, or instructions for identifying the overlapping portion of allocations may be a partial overlap between the first RACH resource allocation associated with the basic UE capability level and the second RACH resource allocation associated with the reduced capability UE capability level, where the random access signaling may be received on a non-overlapping portion of the second RACH resource allocation and includes the capability information.

Some examples of the method, apparatuses, and non-transitory computer-readable medium described herein may further include operations, features, means, or instructions for identifying the overlapping portion of allocations may be a partial overlap between the third RACH resource allocation associated with the second capability level or repetition preferences, or both, and the second RACH resource allocation associated with the reduced capability UE capability level.

Some examples of the method, apparatuses, and non-transitory computer-readable medium described herein may further include operations, features, means, or instructions for receiving the random access signaling including the capability information on the overlapping portion based on the overlapping portion being enabled for reduced capability UE capability reporting.

Some examples of the method, apparatuses, and non-transitory computer-readable medium described herein may further include operations, features, means, or instructions for receiving the random access signaling including the capability information on a non-overlapping portion of the second RACH resource allocation for associated with the reduced capability UE capability level based on the overlapping portion being disabled for reduced capability UE capability reporting.

Some examples of the method, apparatuses, and non-transitory computer-readable medium described herein may further include operations, features, means, or instructions for identifying the overlapping portion of allocations based on the third RACH resource allocation associated with the second capability level or repetition preferences, or both, being a subset of the second RACH resource allocation associated with the reduced UE capability level and receiving the random access signaling including the capability information on a non-overlapping portion of the second RACH resource allocation associated with the reduced capability UE capability level based on the third RACH resource allocation being enabled for capability information or repetition preferences reporting for the second capability level or repetition preferences, or both.

Some examples of the method, apparatuses, and non-transitory computer-readable medium described herein may further include operations, features, means, or instructions for identifying the overlapping portion of allocations based on the third RACH resource allocation associated with the second capability level or repetition preferences, or both, being a subset of the second RACH resource allocation associated with the reduced capability UE capability level and receiving the random access signaling including the capability information on a non-overlapping portion of the second RACH resource allocation associated with the reduced capability UE capability level or on the overlapping portion based on the third RACH resource allocation being disabled for capability information or repetition preference reporting for the second capability level or repetition preferences, or both.

Some examples of the method, apparatuses, and non-transitory computer-readable medium described herein may further include operations, features, means, or instructions for transmitting an indication enabling the third RACH resource allocation associated with the second capability level or repetition preferences, or both, where the second RACH resource allocation at least partially overlaps the third RACH resource allocation, the UE may be associated with the second capability level or repetition preferences, or both, and the second capability level or repetition preferences may be a coverage enhancement UE capability level or repetition preferences level.

In some examples of the method, apparatuses, and non-transitory computer-readable medium described herein, receiving the random access signaling may include operations, features, means, or instructions for receiving the random access signaling including the capability information or the repetition preferences, or both, associated with the coverage enhancement UE capability level or repetition preferences level based on the second RACH resource allocation associated with the reduced capability UE capability level being a subset of the third RACH resource allocation associated with the coverage enhancement UE capability level or repetition preferences level.

In some examples of the method, apparatuses, and non-transitory computer-readable medium described herein, receiving the random access signaling may include operations, features, means, or instructions for receiving the random access signaling including the capability information associated with the reduced capability UE capability level based on the third RACH resource allocation associated with the coverage enhancement UE capability level or repetition preferences level being a subset of the second RACH resource allocation associated with the reduced capability UE capability level.

In some examples of the method, apparatuses, and non-transitory computer-readable medium described herein, receiving the random access signaling may include operations, features, means, or instructions for receiving the random access signaling indicating the capability information including a reduced bandwidth capability, a reduced receive antenna number capability, a reduced receiver antenna gain capability, a reduced number of receive chain capability, a reduced HARQ processing capability, a reduced CSI processing capability, a reduced beam measurement or reporting capability, a half-duplex frequency division duplexing capability, or any combination thereof.

Some examples of the method, apparatuses, and non-transitory computer-readable medium described herein may further include operations, features, means, or instructions for identifying that capability reporting associated with the first capability level may be disabled for the second RACH resource allocation, where the random access signaling may be received without the capability information.

Some examples of the method, apparatuses, and non-transitory computer-readable medium described herein may further include operations, features, means, or instructions for transmitting, to the UE, an indication that the capability reporting associated with the first capability level may be disabled.

In some examples of the method, apparatuses, and non-transitory computer-readable medium described herein, the identifying may include operations, features, means, or instructions for identifying the second RACH resource allocation associated with the first capability level may be a subset of the first RACH resource allocation associated with the basic UE capability level.

In some examples of the method, apparatuses, and non-transitory computer-readable medium described herein, the identifying may include operations, features, means, or instructions for identifying the second RACH resource allocation associated with the first capability level may be a subset of the third RACH resource allocation associated with the second capability level or repetition preferences, or both.

Some examples of the method, apparatuses, and non-transitory computer-readable medium described herein may further include operations, features, means, or instructions for transmitting an indication enabling the third RACH resource allocation associated with the second capability level or repetition preferences, or both, where the capability of the UE may be associated with the second capability level or repetition preferences, or both, and where the second capability level may be a coverage enhancement UE capability level or repetition preferences level.

Some examples of the method, apparatuses, and non-transitory computer-readable medium described herein may further include operations, features, means, or instructions for identifying the overlapping portion of allocations may be a partial overlap between the first RACH resource allocation associated with the basic UE capability level and the third RACH resource allocation associated with the coverage enhancement UE capability level or repetition preferences level, where the random access signaling may be received on a non-overlapping portion of the third RACH resource allocation and includes the capability information or the repetition preferences, or both.

Some examples of the method, apparatuses, and non-transitory computer-readable medium described herein may further include operations, features, means, or instructions for identifying the overlapping portion of allocations may be a partial overlap between the third RACH resource allocation associated with the coverage enhancement UE capability level or repetition preferences level and the second RACH resource allocation associated with the first capability level.

Some examples of the method, apparatuses, and non-transitory computer-readable medium described herein may further include operations, features, means, or instructions for receiving the random access signaling including the capability information or repetition preferences, or both, on the overlapping portion based on the overlapping portion being enabled for coverage enhancement UE reporting or repetition preferences reporting.

Some examples of the method, apparatuses, and non-transitory computer-readable medium described herein may further include operations, features, means, or instructions for receiving the random access signaling indicating the capability information or repetition preferences, or both, on a non-overlapping portion of the third RACH resource allocation for associated with the coverage enhancement UE capability level or repetition preferences level based on the overlapping portion being disabled for coverage enhancement UE capability reporting or repetition preferences reporting.

Some examples of the method, apparatuses, and non-transitory computer-readable medium described herein may further include operations, features, means, or instructions for identifying the overlapping portion of allocations based on the second RACH resource allocation associated with the first capability level being a subset of the third RACH resource allocation associated with the coverage enhancement capability level or repetition preferences level and receiving the random access signaling including the capability information or the repetition preferences, or both, on a non-overlapping portion of the third RACH resource allocation associated with the coverage enhancement UE capability level or repetition preferences level based on the second RACH resource allocation associated with the first capability level being enabled for capability reporting.

Some examples of the method, apparatuses, and non-transitory computer-readable medium described herein may further include operations, features, means, or instructions for identifying the overlapping portion of allocations based on the second RACH resource allocation associated with the first capability level being a subset of the third RACH resource allocation associated with the coverage enhancement UE capability level or repetition preferences level and receiving the random access signaling including the capability information or the repetition preferences, or both, on a non-overlapping portion of the third RACH resource allocation associated with the coverage enhancement UE capability level or repetition preferences level or on the overlapping portion based on the second RACH resource allocation being disabled for capability reporting.

In some examples of the method, apparatuses, and non-transitory computer-readable medium described herein, transmitting the random access signaling may include operations, features, means, or instructions for receiving the random access signaling indicating the capability information or repetition preferences, or both, including one or more of a message 2 PDCCH or PDSCH repetition capability, a message 2 PDCCH or PDSCH repetition preference, a message 2 PDCCH/PDSCH repetition number preference, a message 3 PUSCH repetition capability, a message 3 PUSCH repetition preference, a message 3 PUSCH repetition number preference, a message 4 PDCCH or PDSCH or PUCCH repetition capability, a message 4 PDCCH or PDSCH or PUCCH repetition preference, or a message 4 PDCCH or PDSCH or PUCCH repetition number preference.

Some examples of the method, apparatuses, and non-transitory computer-readable medium described herein may further include operations, features, means, or instructions for identifying that the capability information and the repetition preference reporting associated with the second capability level or repetition preferences, or both, may be disabled for the third RACH resource allocation, where the random access signaling may be received without the capability information or the repetition preferences.

Some examples of the method, apparatuses, and non-transitory computer-readable medium described herein may further include operations, features, means, or instructions for transmitting, to the UE, an indication that capability or preference reporting associated with the second capability level or repetition preferences, or both, may be disabled.

In some examples of the method, apparatuses, and non-transitory computer-readable medium described herein, the identifying may include operations, features, means, or instructions for identifying the third RACH resource allocation associated with the second capability level or repetition preferences, or both, may be a subset of the first RACH resource allocation associated with the basic UE capability level.

In some examples of the method, apparatuses, and non-transitory computer-readable medium described herein, the identifying may include operations, features, means, or instructions for identifying the third RACH resource allocation associated with the second capability level or repetition preferences, or both, may be a subset of the second RACH resource allocation associated with the first capability level.

In some examples of the method, apparatuses, and non-transitory computer-readable medium described herein, transmitting the control signaling may include operations, features, means, or instructions for transmitting an indication of a first set of RACH occasions for a first of the at least two RACH resource allocations and a second set of RACH occasions for a second of the at least two RACH resource allocations, where the first set of RACH occasions and the second set of RACH occasions include one or more common RACH occasions.

In some examples of the method, apparatuses, and non-transitory computer-readable medium described herein, transmitting the control signaling may include operations, features, means, or instructions for transmitting an indication of a first set of RACH preambles for a first of the at least two RACH resource allocations and a second set of RACH preambles for a second of the at least two RACH resource allocations, where the first set of RACH preambles and the second set of RACH preambles include one or more common RACH occasions.

DETAILED DESCRIPTION

Figure 1:
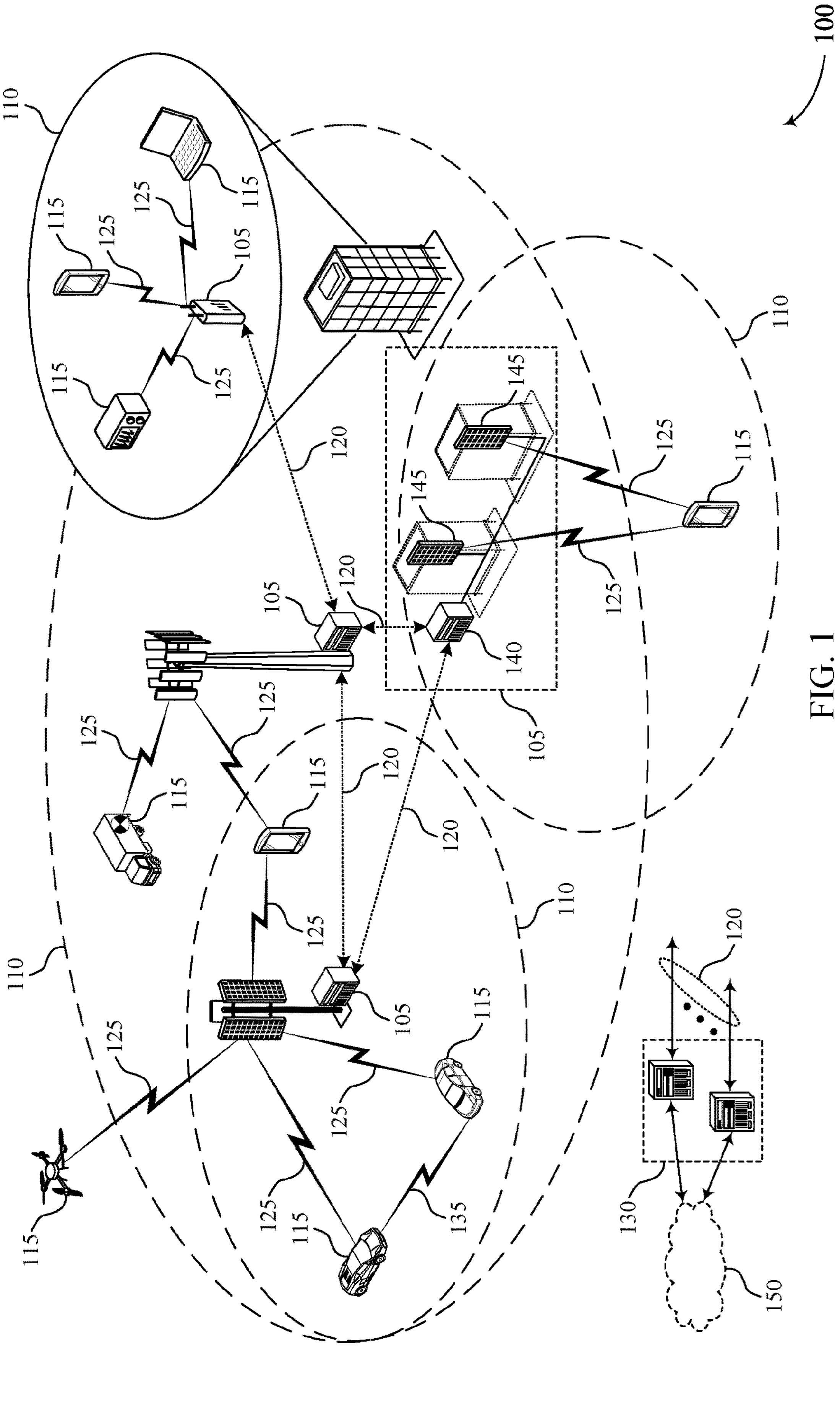
FIG. 1 illustrates an example of a wireless communications system that supports random access channel (RACH) resource configuration for different capability user equipment (UEs) in accordance with aspects of the present disclosure.

A wireless communications systems may support user equipment (UEs) of different types or UEs with different capability levels. For example, the wireless communications system may support reduced capability UEs and coverage enhancement UEs alongside UEs with general enhanced mobile broadband (eMBB) capabilities or legacy, or basic, UEs. In some cases, coverage enhancement UEs and reduced capability UEs may be configured with separate random access channel (RACH) resources, which may be used for coverage enhancement RACH signaling and reduced capability RACH signaling. In particular, a coverage enhancement UE and a reduced capability UE may use their respective RACH resources to transmit a capability report in connection with a first RACH message of a RACH procedure. For example, a reduced capability UE may send RACH signaling with an early indication of reduced capabilities in a first RACH message, and a coverage enhancement UE may include an indication of support for RACH message repetition in the first RACH message.

In some cases, reduced capability UEs or coverage enhancement UEs, or both, may be configured with RACH resources that are overlapping, or shared, with each other or with UEs that have other capability levels. For example, coverage enhancement RACH resources may overlap with the reduced capability RACH resources, or the coverage enhancement RACH resources may overlap with legacy RACH resources, or both. However, some current systems do not provide techniques to manage these overlapping RACH resources and how a coverage enhancement UE or reduced capability UE can send capability information when different types of RACH resources at least partially overlap.

The present disclosure provides techniques for RACH signaling when multiple types of RACH resources are configured to at least partially overlap. For example, a reduced capability UE may be configured with a first set of RACH resources for reduced capability UEs which at least partially overlaps with at least a second set of RACH resources. The reduced capability UE may identify whether the first set of RACH resources can be used to indicate capability information based on whether reporting is enabled and based on how the RACH resources overlap. For example, the first set of RACH resources may be enabled for capability reporting, and the first set of RACH resources may partially overlap with RACH resources for coverage enhancement UEs. In some cases, the reduced capability UE may send capability information using the non-overlapping portion of the first set of resources, such as if the coverage enhancement RACH resources are enabled for reporting capability information or repetition preferences (e.g., one or more message repetition preferences for a RACH procedure).

In some example, the UE may be supported to send the capability information using the overlapping portion of resources. In some cases, a base station may configure whether the UE is supported to send the capability information using the overlapping portion of the resources. For example, reduced capability RACH resources may overlap coverage enhancement RACH resources, while capability reporting for reduced capability devices is enabled, and capability or preference reporting for coverage enhancement devices is not enabled Additional scenarios and examples are described herein, as well as techniques for identifying whether the configured resources may be used for capability or preference signaling. For example, various scenarios are described where RACH resources associated with different capability levels, such as any one or more of reduced capability RACH resources, coverage enhancement RACH resources, and legacy RACH resources, are configured to partially or completely overlap.

Aspects of the disclosure are initially described in the context of wireless communications systems. Aspects of the disclosure are further illustrated by and described with reference to apparatus diagrams, system diagrams, and flowcharts that relate to RACH resource configuration for different capability UEs.

FIG. 1 illustrates an example of a wireless communications system 100 that supports RACH resource configuration for different capability UEs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support UEs 115 with different capability levels. For example, the wireless communications system 100 may include reduced capability UEs 115, coverage enhancement UEs 115, repetition preference reporting UEs 115, legacy UEs 115 or basic UEs 115, or any combination thereof. In some cases, UEs 115 with different capabilities may be configured with different RACH resources. For example, a base station 105 may configure reduced capability RACH resources, coverage enhancement RACH resources, and legacy RACH resources. The different RACH resource allocations may at least partially overlap. A UE 115 with a certain capability level, such as coverage enhancement, repetition preferences, or reduce capabilities, or any combination thereof, may identify whether capability or repetition preference reporting is enabled for a RACH resource allocation. The UE 115 may identify whether the UE 115 can send capability or capability information using the RACH resource allocation based on how the RACH resource allocation overlaps with other RACH resource allocations for different capability levels.

Figure 2:
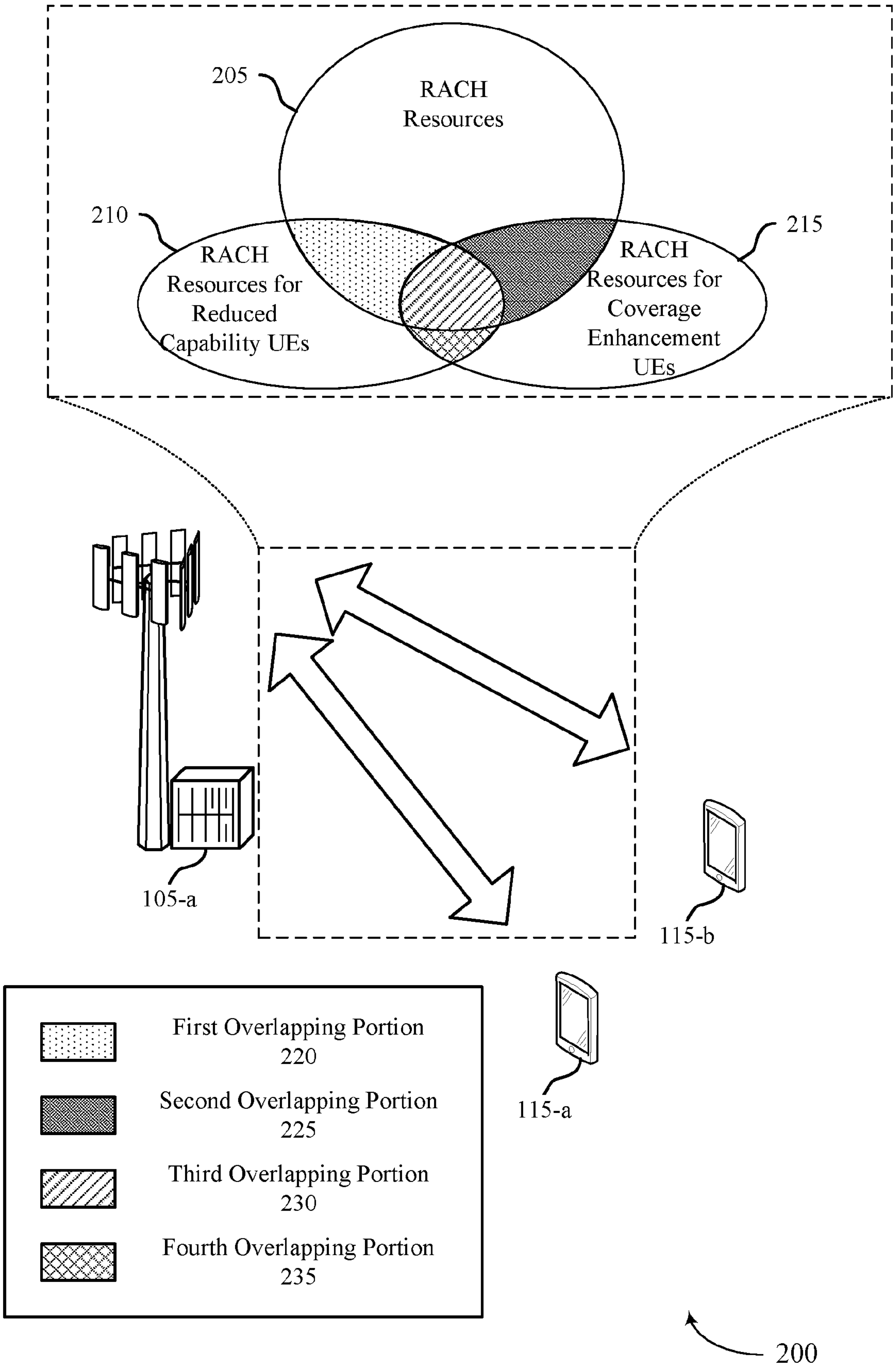
FIG. 2 illustrates an example of a wireless communications system that supports RACH resource configuration for different capability UEs in accordance with aspects of the present disclosure.

FIG. 2 illustrates an example of a wireless communications system 200 that supports RACH resource configuration for different capability UEs in accordance with aspects of the present disclosure. The wireless communications system 200 may include base station 105-*a*, UE 115-*a*, and UE 115-*b*. Base station 105-*a* may be an example of a base station 105 as described with reference to FIG. 1. UE 115-*a* and UE 115-*b* may each be an example of a UE 115 as described herein.

The wireless communications system 200 may include UEs 115 with different capability levels. UE 115-*a* and UE 115-*b* may be examples of UEs 115 with different capability levels. For example, UE 115-*a* may be an example of a reduced capability UE 115. UE 115-*b* may be an example of a coverage enhancement UE 115 or a repetition preferences UE 115 (e.g., a UE 115 supported to report one or more message repetition preferences). The wireless communications system 200 may include these devices as well as other UEs 115 with different capability levels, such as legacy UEs 115. or basic UEs 115. In an example, a basic UE 115 may be a UE 115 which does not report a coverage enhancement capability, a reduced capability, or RACH message repetition preferences.

A reduced capability UE 115, such as UE 115-*a*, may be able to transmit an early indication of reduced capabilities. For example, for a four step RACH procedure, UE 115-*a* may indicate reduced capabilities in a first message of the four step RACH procedure (e.g., Message 1). In some cases, UE 115-*a* may support early indication of reduced capabilities in a third message of the four step RACH procedure (e.g., Message 3). A reduced capability UE 115 may support, for example, reduced bandwidth, a reduced number of receive antennas, reduced receive antenna gain, half duplex FDD communications, reduced transmit power, a reduced number of receive chains, reduced HARQ processing capabilities, reduced CSI processing, reduced beam management capabilities, or any combination thereof. In some cases, UE 115-*a* may indicate any one or more of these capabilities in RACH signaling, such as the early indication in Message 1 or Message 3, or both. In some cases, the early indication 1 may be configured to be toggleable, or enabled and disabled, by a base station 105 such as base station 105-*a*.

A coverage enhancement-capable UE 115, such as UE 115-*b*, may be supported to send UE capabilities or repetition preferences for some PDCCH/PDSCH/PUCCH/PUSCH in RACH procedure. For example, as a coverage enhancement UE 115, UE 115-*b* may support message repetition for one or more different RACH messages, such as Message 2 physical downlink control channel (PDCCH) or physical downlink shared channel (PDSCH) repetition, Message 3 physical uplink shared channel (PUSCH) repetition, Message 4 PDCCH, PDSCH, or physical uplink control channel (PUCCH) repetition, or any combination thereof. In some cases, UE 115-*b* may transmit RACH signaling indication one or more of these capabilities, corresponding preferred message repetition numbers for the message repetition capabilities, or a preference for enabling message repetition for any one or more of the message repetition capabilities. For example, UE 115-*b* may indicate Message 2 PDCCH/PDSCH repetition, a repetition number (e.g., a number of repetitions for the Message 2 PDCCH/PDSCH), and a preference for enabling or disabling Message 2 PDCCH/PDSCH repetition in RACH signaling, such as Message 1 of a RACH procedure.

In some cases, to request message repetition or a message repetition number, UE 115-*b* may use a coverage enhancement-specific preamble on a RACH occasion which may be configured by a same RACH configuration index as basic UEs 115. In some other examples, UE 115-*b* may use a separate RACH occasion configured by a separate RACH configuration index which is only used for coverage enhancement UEs 115. Additionally, or alternatively, UE 115-*b* may use a separate RACH occasion, where UE 115-*b* may use the separate RACH occasions configured by a coverage enhancement-specific RACH configuration index, or UE 115-*b* may use a remaining RACH occasion, if any, configured by a same RACH configuration index as basic UEs 115 that cannot be used by the basic UEs 115.

A UE 115 may be a reduced capability UE 115, a coverage enhancement UE 115, or both. For example, some UEs 115 may have aspects of both reduced capabilities and coverage enhancement. In some cases, a UE 115 which only has reduced capabilities may be referred to as a RedCap (e.g., reduced capability) UE 115, and a UE 115 which only has coverage enhancement capabilities may be referred to as a CovEnh (e.g., coverage enhancement) UE 115. A UE 115 which supports both may be referred to as a CovEnh+RedCap UE 115.

In some cases, reduced capability UEs 115 may be configured with a set of reduced capability RACH resources 210. The set of reduced capability RACH resources 210 may be dedicated for reduced capability RACH UEs 115, or the set of reduced capability RACH resources 210 may overlap with non-reduced capability RACH resources. For example, the set of reduced capability RACH resources 210 may at least partially overlap a set of RACH resources 205, which may be used for basic UEs 115, to create a first overlapping portion 220. The first overlapping portion 220 may include RACH resources, such as RACH occasions or RACH preambles, which may be shared between reduced capability UEs 115 and basic UEs 115.

Similarly, coverage enhancement UEs 115 or repetition preferences UEs 115, or both, may be configured with a set of coverage enhancement RACH resources 215. In some cases, the set of coverage enhancement RACH resources 215 may be dedicated for coverage enhancement RACH UEs 115 or UEs 115 which are supported to report message repetition preferences, or both. In some cases, the set of coverage enhancement RACH resources 215 may overlap with non-coverage enhancement RACH resources. For example, the set of coverage enhancement RACH resources 215 may at least partially overlap the set of RACH resources 205 for basic UEs 115, which may create a second overlapping portion 225. The second overlapping portion 225 may include RACH resources, such as RACH occasions or RACH preambles, which may be shared between coverage enhancement UEs 115 and non-coverage enhancement UEs 115. In some cases, the set of reduced capability RACH resources 210 and the set of coverage enhancement RACH resources 215 may be configured via a first system information block (SIB) (e.g., SIB1) for RACH resources.

In some cases, the set of reduced capability RACH resources 210 may overlap with the set of coverage enhancement RACH resources 215 and the set of RACH resources 205, creating a third overlapping portion 230. For example, UE 115-*a*, as a reduced capability UE 115, may be configured with some of the same RACH occasions or RACH preambles as UE 115-*b* (e.g., a coverage enhancement UE 115). In some cases, these overlapping resources may also be shared with basic UEs 115.

In some examples, the set of reduced capability RACH resources 210 and the set of coverage enhancement RACH resources 215 may have overlapping RACH resources which are not shared by basic UEs 115. For example, the set of reduced capability RACH resources 210 and the set of coverage enhancement RACH resources 215 may overlap each other, but not the set of RACH resources 205, creating a fourth overlapping portion 235.

In some cases, RACH resource sets may be configured to overlap in different ways. In an example, at least two overlapping RACH resource sets may share a number of RACH occasions. For example, the reduced capability RACH resources 210 may be configured with one or more common RACH occasions as the coverage enhancement RACH resources 215. Then, RACH preambles may be partitioned between the at least two types of usages (e.g., reduced capability, and coverage enhancement, and legacy), where the preambles may be partly overlapped among the usages. In another example, at least two overlapping RACH resource sets for different usages may be configured to share a number of RACH preambles. Then, RACH occasions may be partitioned between the at least two different usages, where the RACH occasions may be partly overlapped or shared between the at least two different usages.

A UE 115 associated with a capability level, such as UE 115-*a* or UE 115-*b*, may identify whether capability-related reporting is enabled and how different RACH resource sets overlap in order to determine whether capability information or repetition preferences, or both, can be sent using RACH signaling. For example, UE 115-*a* may identify how the set of reduced capability RACH resources 210 overlaps with the set of RACH resources 205 and the set of coverage enhancement RACH resources 215, and UE 115-*a* may determine whether UE 115-*a* can send an early indication of reduced capabilities on RACH resources allocated for UE 115-*a*.

For example, UE 115-*a* may identify whether the set of reduced capability RACH resources 210 that at least partly overlap with other sets of RACH resources can be used to early indicate reduced capability-specific capabilities. In some cases, base station 105-*a* may configure whether UE 115-*a* can indicate reduced capabilities on a non-overlapping portion of the set of reduced capability RACH resources 210 or any one or more overlapping portions of the set of reduced capability RACH resources 210 (e.g., the first overlapping portion 220, the third overlapping portion 230, or the fourth overlapping portion 235), or any combination thereof.

Similarly, UE 115-*b* may identify whether the set of coverage enhancement RACH resources 215 that at least partly overlap with other sets of RACH resources can be used to early indicate coverage enhancement-specific capabilities or preferences. In some cases, base station 105-*a* may configure whether UE 115-*b* can indicate coverage enhancement capabilities or message repetition preferences, or both, on a non-overlapping portion of the set of coverage enhancement RACH resources 215 or any one or more overlapping portions of the set of reduced capability RACH resources 210 (e.g., the second overlapping portion 225, the third overlapping portion 230, or the fourth overlapping portion 235), or any combination thereof.

For example, a UE 115, such as UE 115-*a* as a reduced capability UE 115 or UE 115-*b* as a coverage enhancement UE 115, may determine whether an identified overlapping RACH resource is enabled or disabled for sending capability-related information. For example, UE 115-*a* may determine whether early indication signaling is enabled or disabled for the set of reduced capability RACH resources 210. The UE 115 may also determine whether any overlapping portions of the RACH resources can be used for capability-related signaling. For example, UE 115-*a* may then determine whether early indication of reduced capability information is enabled, disabled, or supported on the first overlapping portion 220, the third overlapping portion 230, the fourth overlapping portion 235, or any combination thereof.

The wireless communications system 200 may support techniques for enabling and disabling capability-related signaling for an entire RACH resource set. For example, the reduced capability RACH resources 210 may be disabled for capability-related signaling, and UE 115-*a* may be unable to send early indication signaling for reduced capabilities. In another example, the coverage enhancement RACH resources 215 may be disabled for capability-related signaling, and UE 115-*b* may be unable to send message repetition capabilities or preferences.

Additionally, or alternatively, the wireless communications system 200 may support techniques for enabling and disabling capability-related signaling for a subset of a RACH resource set. For example, the reduced capability RACH resources 210 may be enabled for capability-related signaling, but the fourth overlapping portion 235 may be disabled for capability-related signaling. Therefore, UE 115-*a* may use a non-overlapping portion of the reduced capability RACH resources 210 to send the early indication of reduced capabilities, or a portion of the reduced capability RACH resources which does not overlap with the RACH resources 205 or the coverage enhancement RACH resources 215.

In some cases, base station 105-*a* may indicate which subsets of the RACH resources are enabled or disabled. For example, base station 105-*a* may transmit an indication that capability-related signaling is enabled for the reduced capability RACH resources 210 and disabled for the fourth overlapping portion 235. In some cases, base station 105-*a* may indicate that the fourth overlapping portion 235 may be used for reduced capability early indication but not coverage enhancement capability or message repetition preference signaling, or that the fourth overlapping portion 235 is enabled for coverage enhancement capability or message repetition preference signaling but not reduced capability early indication. In some cases, any number of overlapping portions may be indicated as enabled or disabled, either entirely as a subset for capability-related signaling, or enabled or disabled for usage-specific (e.g., capability level-specific) capability signaling. In some examples, base station 105-*a* may indicate whether non-overlapping portions of the reduced capability RACH resources 210 or non-overlapping portions of the coverage enhancement RACH resources 215 support capability-related signaling.

In some cases, portions of a capability level-specific RACH resource which overlaps with legacy RACH resources may not be used for capability-related signaling. For example, UE 115-*a* may not use the first overlapping portion 220 or the third overlapping portion 230 to transmit an early indication for reduced capabilities. Similarly, UE 115-*b* may not use the second overlapping portion 225 or the third overlapping portion 230 for coverage enhancement capability information or message repetition preference indication. In some other examples, portions of the reduced capability RACH resources 210 or the coverage enhancement RACH resources 215 which overlap the RACH resources 205 may be used for capability-related signaling, and base station 105-*a* may indicate whether these overlapping portions are enabled or disabled for capability-related signaling.

Figure 3:
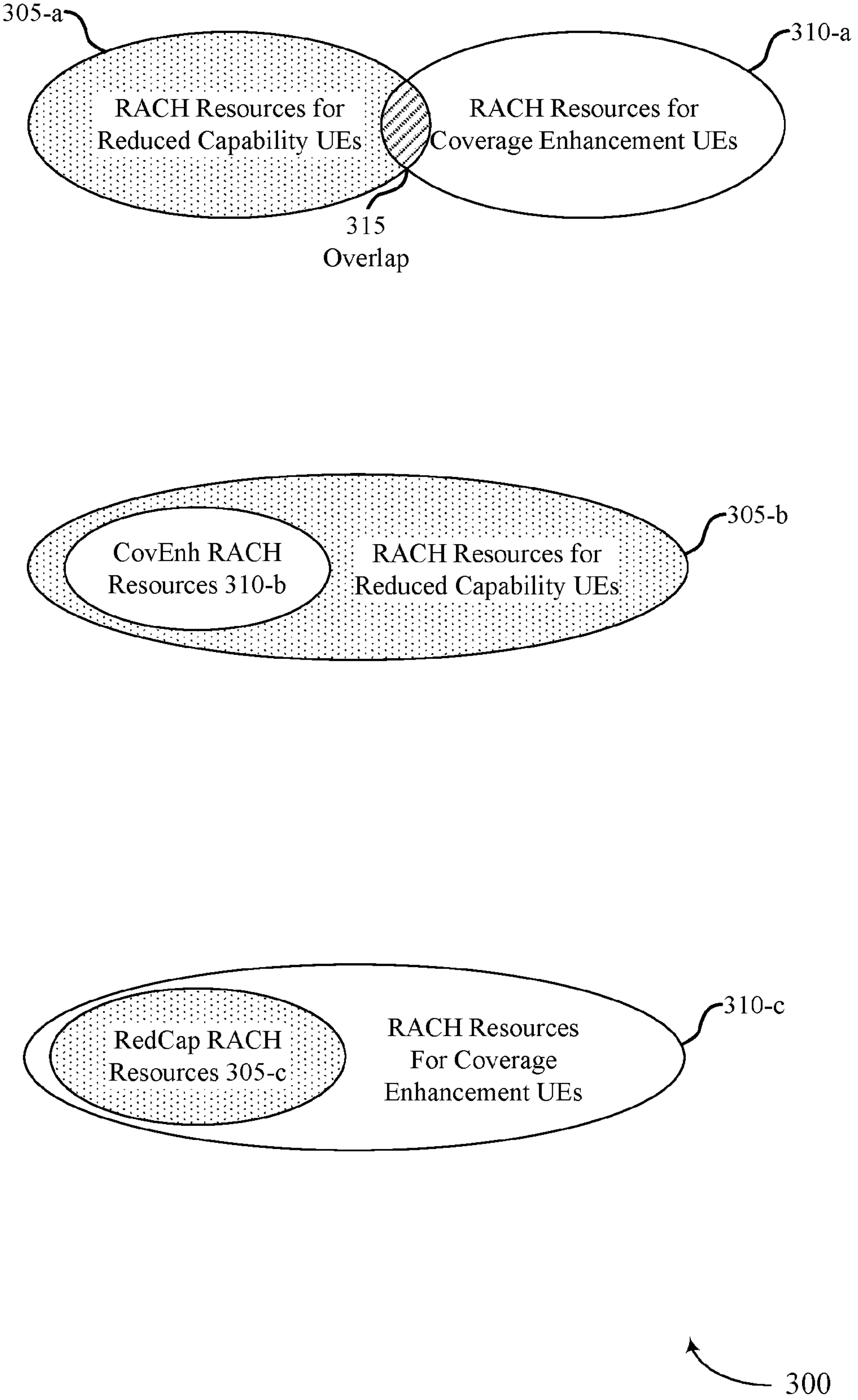
FIGS. 3 through 5 illustrate examples of overlapping RACH resource configurations that support RACH resource configuration for different capability UEs in accordance with aspects of the present disclosure.

FIG. 3 illustrates an example of an overlapping RACH resource configuration 300 that supports RACH resource configuration for different capability UEs in accordance with aspects of the present disclosure.

The overlapping RACH resource configuration 300 includes examples of overlapping RACH resources for different usages. In a first example, reduced capability RACH resource 305-*a* may partially overlap coverage enhancement RACH resource 310-*a*. For example, there may be a non-overlapping portion of reduced capability RACH resource 305-*a*, a non-overlapping portion of coverage enhancement RACH resource 310-*a*, and an overlapping portion 315. The overlapping portion 315 may correspond to RACH occasions or RACH preambles, or both, which are configured both for reduced capability usages and coverage enhancement usages.

In a second example, reduced capability RACH resource 305-*b* may completely overlap coverage enhancement RACH resource 310-*b*. In this example, each RACH occasion or RACH preamble, or both, configured for coverage enhancement RACH usages may also be configured for reduced capability RACH usages. However, some RACH occasions or RACH preambles, or both, configured for reduced capability usages may not also be used for coverage enhancement RACH usages.

In a third example, coverage enhancement RACH resource 310-*c* may completely overlap reduced capability RACH resource 305-*c*. In this example, each RACH occasion or RACH preamble, or both, configured for reduced capability RACH usages may also be configured for coverage enhancement RACH usages. However, some RACH occasions or RACH preambles, or both, configured for coverage enhancement usages may not also be used for reduced capability RACH usages.

In some cases, a UE 115 may determine whether capability-related RACH signaling is supported or enabled for a RACH resource or a subset of the RACH resource. For example, a reduced capability UE 115 may determine whether capability-related signaling (e.g., early indication of reduced capabilities) is enabled or supported for a reduced capability RACH resource 305. Additionally, or alternatively, the reduced capability UE 115 may determine whether subsets of the reduced capability RACH resource 305 are enabled for capability-related signaling. For example, the reduced capability UE 115 may identify whether the overlapping portion 315 is enabled for capability-related signaling.

In some examples, the reduced capability UE 115, if it does not also support coverage enhancement capabilities or message repetition, or both, may refrain from transmitting early indication of reduced capabilities on resources which overlap with a coverage enhancement RACH resource 310. For example, in some cases, the reduced capability UE 115 may not transmit the early indication on the overlapping portion 315, the portion of the reduced capability RACH resource 305-*b* which overlaps with the coverage enhancement RACH resource 310-*b*, or the reduced capability RACH resource 305-*c*. The reduced capability UE 115 may, in some cases, be supported to send capability information using a non-overlapping portion of the reduced capability RACH resource 305-*a* or a non-overlapping portion of the reduced capability RACH resource 305-*b*.

For example, a reduced capability-only UE 115 may identify portions of a reduced capability RACH resource 305 which at least partly overlap with a coverage enhancement RACH resource 310. If both the reduced capability RACH resources 305 and the at least partly overlapping coverage enhancement RACH resources 310 are enabled, the reduced capability 115 may avoid using the overlapped portions. For example, the reduced capability RACH resources 305-*c* may be a subset of the coverage enhancement RACH resources 310-*c*, and the reduced capability UE 115 may not be enabled to report reduced capability-specific capabilities on the reduced capability RACH resources 305-*c*.

Similarly, a coverage enhancement UE 115 may determine whether capability-related signaling (e.g., of coverage enhancement-related capabilities) is enabled or supported for a coverage enhancement RACH resource 310. Additionally, or alternatively, the coverage enhancement UE 115 may determine whether subsets of the coverage enhancement RACH resource 310 are enabled for capability-related signaling. For example, the coverage enhancement UE 115 may identify whether the overlapping portion 315 is enabled for capability-related signaling.

In some examples, the coverage enhancement UE 115, if it is not also a reduced capabilities UE 115, may refrain from transmitting capability information on resources which overlap with a reduced capability RACH resource 305. For example, in some cases, the coverage enhancement UE 115 may not transmit the early indication on the overlapping portion 315, the portion of the coverage enhancement RACH resource 310-*c* which overlaps with the reduced capability RACH resource 305-*c*, or the coverage enhancement RACH resource 310-*b*. The coverage enhancement UE 115 may, in some cases, be supported to send capability information using a non-overlapping portion of the coverage enhancement RACH resource 310-*a* or a non-overlapping portion of the coverage enhancement RACH resource 310-*c*.

In some cases, a wireless communications system may configure pre-defined rules for how capability-specific signaling may be sent using capability level-specific RACH resources. For example, a reduced capability UE 115 may be preconfigured to avoid using resources which overlap with coverage enhancement RACH resources for an early indication of reduced capabilities. Additionally, or alternatively, a base station 105 may transmit an indication of which RACH resources or which RACH resource subsets, or both, support capability signaling.

In some cases, a UE 115 which supports both reduced capabilities and coverage enhancement may use either a non-overlapping or an overlapping portion of a reduced capability RACH resource 305 or a coverage enhancement RACH resource 310 to report capability information. For example, the UE 115 may report coverage enhancement capabilities, message repetition preferences, or reduced capabilities using the overlapping portion 315. In some cases, the UE 115 which supports both reduced capabilities and coverage enhancement may be indicated whether capability reporting is enabled for an overlapping portion on a per-usage basis. For example, the UE 115 may be indicated that the UE 115 can report either coverage enhancement capabilities or an early indication of reduced capabilities using the overlapping portion 315, but not both.

Figure 4:
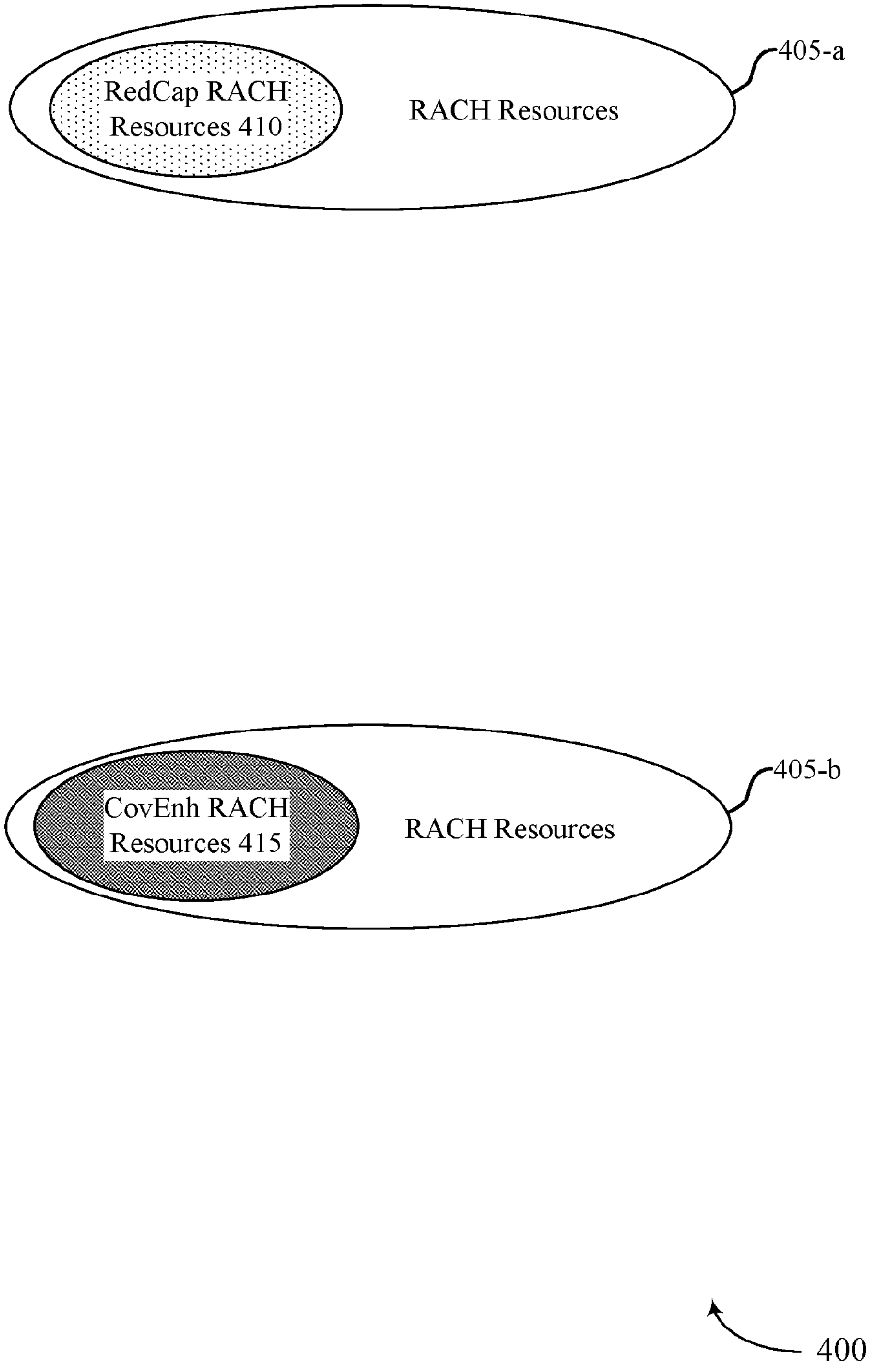

FIG. 4 illustrates an example of an overlapping RACH resource configuration 400 that supports RACH resource configuration for different capability UEs in accordance with aspects of the present disclosure.

The overlapping RACH resource configuration 400 includes examples of overlapping RACH resources for different usages. In a first example, a reduced capability RACH resource 410 may be a subset of a RACH resource 405-*a* for basic UE 115*s*. For example, there may not be any portion of the reduced capability RACH resource 410 which does not overlap the RACH resource 405-*a*. In a second example, a coverage enhancement RACH resource 415 may be a subset of a RACH resource 405-*b* for basic UEs 115. For example, there may not be any portion of the coverage enhancement RACH resource 415 which does not overlap the RACH resource 405-*b*.

In some cases, when a reduced capability RACH resource 410 or a coverage enhancement RACH resource 415 is a subset of a RACH resource 405, a reduced capability UE 115 or a coverage enhancement UE 115, or a UE 115 which supports both, may identify that the capability-specific RACH resource is disabled for capability signaling. For example, a reduced capability UE 115 may be disabled from sending a reduced capabilities report using the reduced capability RACH resource 410, as the reduced capability RACH resource 410 is a subset of the RACH resource 405-*a*. Similarly, a coverage enhancement UE 115 may be disabled from sending a coverage enhancement capabilities report or a message repetition preferences indication using the coverage enhancement RACH resources 415, which is a subset of the RACH resource 405-*b*. In some cases, the UE 115 may be preconfigured that capability reporting is disabled for these scenarios. In some other examples, a base station 105 may indicate to the UE 115 whether capability reporting is enabled or disabled for these RACH resource configurations.

In some cases, a base station 105 may be unable to distinguish a RACH message indicating capabilities from a RACH message from a basic UE 115 when capability-specific RACH resources are a subset of the RACH resources 405. For example, basic UEs 115 may use any portion of the configured RACH resources, including the capability-specific subsets. Therefore, the base station 105 may be unable to determine whether a RACH message corresponds to a UE 115 with a certain capability level (e.g., coverage enhancement, reduced capabilities, or both) or a UE 115 without one of these capability levels.

Figure 5:
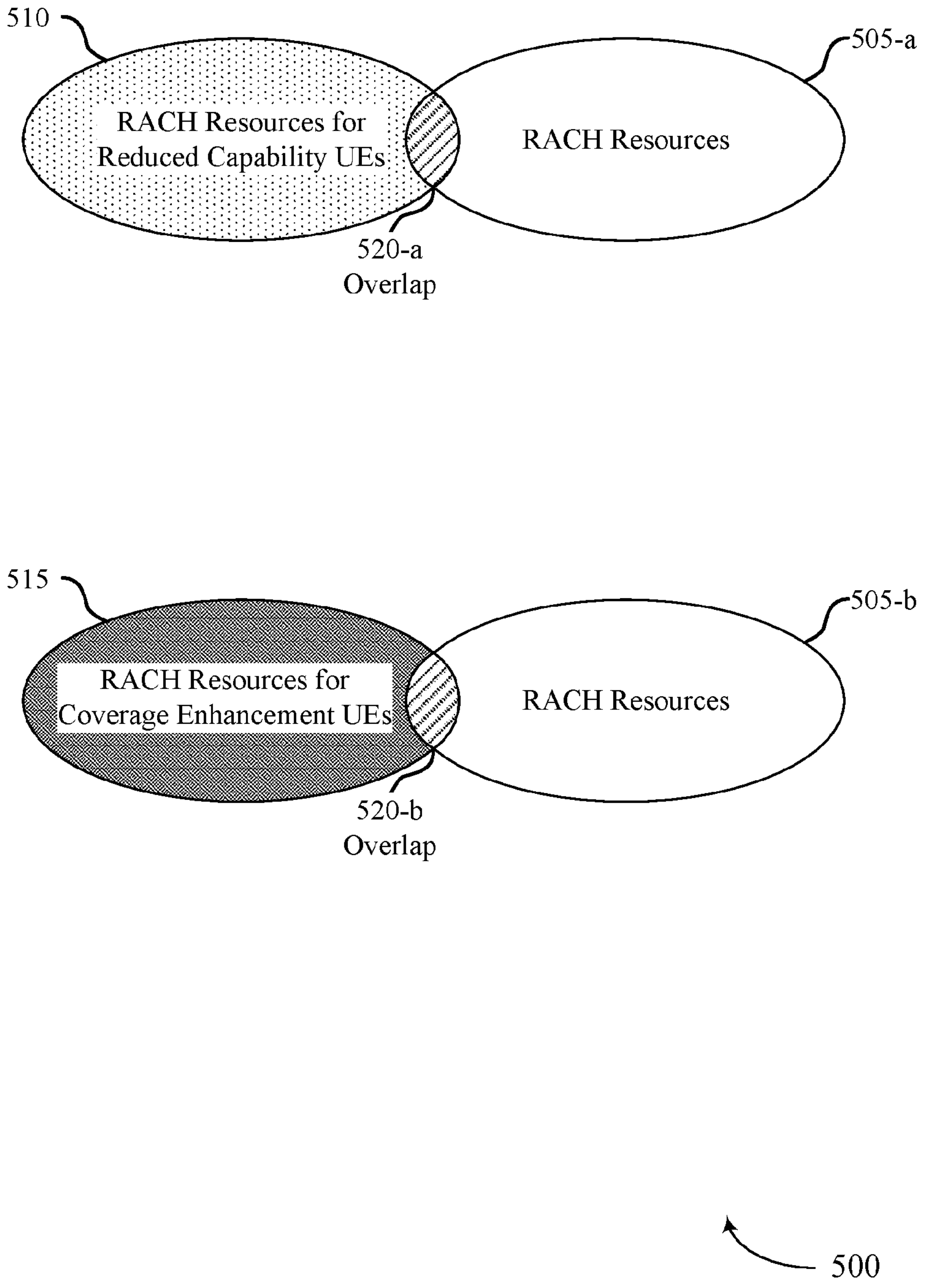

FIG. 5 illustrates an example of an overlapping RACH resource configuration 500 that supports RACH resource configuration for different capability UEs in accordance with aspects of the present disclosure.

The overlapping RACH resource configuration 500 includes examples of overlapping RACH resources for different usages. In a first example, a reduced capability RACH resource 510 may partially overlap with a RACH resource 505-*a* for basic UE 115*s*. In the first example, there may be an overlapping portion 520-*a*, including one or more common RACH occasions or RACH preambles for the two RACH resource sets. In a second example, a coverage enhancement RACH resource 515 may partially overlap with a RACH resource 505-*b* for basic UE 115*s*. In the second example, there may be an overlapping portion 520-*b*.

In some cases, an entire RACH resource may be enabled or disabled for capability reporting. In some examples, a base station 105 may indicate whether a RACH resource or an overlapping portion 515 of the RACH resource is enabled or disabled for capability-rated RACH signaling. For example, the base station 105 may indicate to a reduced capability UE 115 whether the reduced capability RACH resource 510 is enabled or disabled for reporting an early indication of reduced capabilities. In some cases, if capability reporting is enabled for the reduced capability RACH resource 510, the reduced capability UE 115 may avoid sending the report on the overlapping portion 520-*a*. In some examples, the base station 105 may indicate the overlapping portion 520-*a* and whether the overlapping portion 520-*a* is enabled or disabled for capability signaling. In some example, the reduced capability UE 115 may be preconfigured, or may assume, that the overlapping portion 520-*a* is not enabled for capability reporting. For example, in some cases, the reduced capability UE 115 may not expect to be enabled for reduced capability reporting on the overlapping portion 520-*a*. In some examples, the reduced capability UE 115 may identify the overlapping portion 520-*a* and avoid reporting capability information on RACH resources in the overlapping portion 520-*a*.

In another example, the base station 105 may indicate to a coverage enhancement UE 115 whether the coverage enhancement RACH resource 515 is enabled or disabled for reporting a coverage enhancement capabilities or preferences. In some cases, if capability reporting is enabled for the coverage enhancement RACH resource 515, the coverage enhancement UE 115 may avoid sending the report on the overlapping portion 520-*b*. In some examples, the base station 105 may indicate the overlapping portion 520-*a* and whether the overlapping portion 520-*a* is enabled or disabled for capability signaling. In some example, the reduced capability UE 115 may be preconfigured, or may assume, that the overlapping portion 520-*a* is not enabled for capability reporting. The coverage enhancement UE 115 may identify the overlapping portion 520-*b* and avoid reporting capability information on RACH resources in the overlapping portion 520-*b*.

Figure 6:
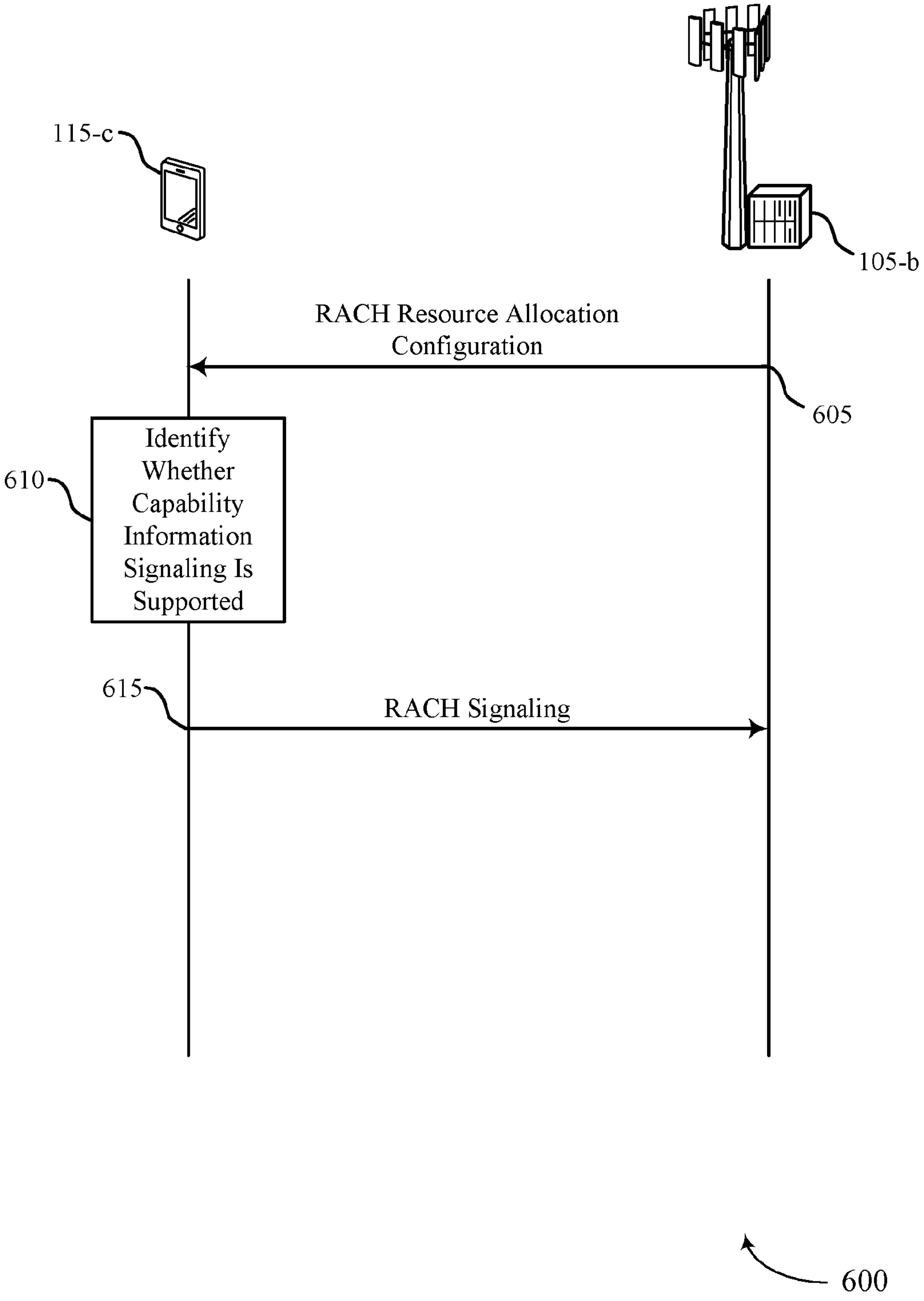
FIG. 6 illustrates an example of a process flow that supports RACH resource configuration for different capability UEs in accordance with aspects of the present disclosure.

FIG. 6 illustrates an example of a process flow 600 that supports RACH resource configuration for different capability UEs in accordance with aspects of the present disclosure. The process flow 600 may be implemented by UE 115-*c* or base station 105-*b*, or both, which may be respective examples of a UE 115 and a base station 105 described herein. UE 115-*c* may be an example of a coverage enhancement UE 115, a reduced capability UE 115, or a reduced capability and coverage enhancement UE 115.

At 605, UE 115-*c* may receive, from base station 105-*b*, an indication of at least a first RACH resource allocation associated with a basic UE capability level, a second RACH resource allocation associated with a first capability level, and a third RACH resource allocation associated with a second capability level or repetition preferences, or both. In some cases, at least two RACH resource allocations of the first RACH resource allocation, the second RACH resource allocation, and the third RACH resource allocation may at least partially overlap in an overlapping portion of allocations. The first capability level and the second capability level may be different and have different capabilities than the basic UE capability level. For example, the first RACH resource allocation may be an example of a reduced capability RACH resource allocation, and the second RACH resource allocation may be an example of a coverage enhancement RACH resource allocation. Additionally, or alternatively, the second RACH resource allocation may be an example of a RACH resource allocation for or repetition preferences level UEs 115.

At 610, UE 115-*c* may identify whether either of the at least two RACH resource allocations is enabled for UE 115-*c* to transmit capability information or repetition preferences, or both, associated with a capability of UE 115-*c*. For example, UE 115-*c* may be a coverage enhancement UE 115 or repetition preferences level UE 115, or both, and UE 115-*c* may determine whether UE 115-*c* can report coverage enhancement capabilities or repetition preferences on the second RACH resource allocation. In some cases, UE 115-*c* may be a reduced capability UE 115, and UE 115-*c* may determine whether UE 115-*c* can report reduce capability information on the first RACH resource allocation.

In some cases, base station 105-*b* may indicate whether reporting is enabled or disabled for an entire RACH resource or for specific subsets. For example, base station 105-*b* may indicate whether capability reporting is enabled for the first RACH resource allocation (e.g., the reduced capability RACH resource allocation), whether capability or repetition preference reporting is enabled for the second RACH resource allocation (e.g., the coverage enhancement RACH resource allocation), or both. In some cases, base station 105-*b* may indicate whether capability or repetition preference reporting is enabled for one or more specific subsets or overlapping portions. For example, if the coverage enhancement RACH resource allocation partially overlaps with a reduced capability RACH resource allocation, base station 105-*b* may indicate whether the overlapping portion is enabled for capability reporting or repetition preference reporting, or both, for coverage enhancement/preference reporting UEs 115, if the overlapping portion is enabled for capability reporting for reduced capability UEs 115, if the overlapping portion is enabled for reporting of neither usage, or if the overlapping portion is enabled for reporting of multiple usages.

For example, UE 115-*c* may be a coverage enhancement UE 115 or a or repetition preferences level UE 115, or both, and UE 115-*c* may identify that capability and repetition preference reporting is enabled for the coverage enhancement RACH resource allocation. UE 115-*c* may identify that the coverage enhancement RACH resource allocation partially overlaps a reduced capability RACH resource, and that reduced capability reporting is also enabled. UE 115-*c* may identify that coverage enhancement capabilities or repetition preferences may be reported using a non-overlapping portion of the coverage enhancement RACH resource allocation. In another example, UE 115-*c* may identify that the coverage enhancement RACH resource allocation partially overlaps the reduced capability RACH resource, but reduced capability reporting is disabled. In this example, UE 115-*c* may identify that coverage enhancement capabilities or request may be transmitted using the non-overlapping portion of the coverage enhancement RACH resource or an overlapping portion with the reduced capability RACH resource. Some additional examples of these techniques are described in more detail with reference to FIG. 3.

In another example, the reduced capability RACH resource allocation may be a subset of the coverage enhancement RACH resource allocation. In this example, UE 115-*c* may be a coverage enhancement UE 115. UE 115-*c* determine that coverage enhancement reporting and reduced capability reporting are both enabled. UE 115-*c* may identify that coverage enhancement capabilities or repetition preferences may not be reported using the overlapping portion of allocations, as reporting for both capability levels is enabled. However, UE 115-*c* may report coverage enhancement capabilities or repetition preferences using a non-overlapping portion of the coverage enhancement RACH resource allocation. Some additional examples of these techniques are described in more detail with reference to FIG. 3.

In another example, the coverage enhancement RACH resource allocation may be a subset of a legacy RACH resource allocation. UE 115-*c* may identify that the coverage enhancement RACH resource allocation may not be used to report coverage enhancement capabilities, as each resource in the coverage enhancement RACH resource allocation is included in the legacy RACH resource allocation. Some additional examples of these techniques are described in more detail with reference to FIG. 4. In some cases, the first RACH resource allocation or the second RACH resource allocation may partially overlap a RACH resource allocation for basic UEs 115. For example, UE 115-*c* may be a coverage enhancement UE 115, and UE 115-*c* may determine that capability reporting for the coverage enhancement RACH resource allocation is enabled. UE 115-*c* may identify that coverage enhancement capability and repetition preference reporting may not be sent using the overlapping portion of resources, but UE 115-*c* may send the capability information using a non-overlapping portion of the first RACH resource allocation. Some additional techniques for this configuration are described in more detail with respect to FIG. 5.

In some examples, UE 115-*c* may be configured with three different types of RACH resource allocations. For example, UE 115-*c* may receive the control signaling indicating the coverage enhancement RACH resource allocation, the reduce capability RACH resource allocation, and the legacy RACH resource allocation, where two or more of the RACH resource allocations may at least partially overlap. UE 115-*c* may similarly determine whether capability or repetition preference reporting is enabled and whether UE 115-*c* may transmit capability or repetition preference information based on how the RACH resource allocations overlap.

At 615, UE 115-*c* may transmit random access signaling over one or more of the at least two overlapping RACH resource allocations, where whether the RACH signaling includes the capability information or repetition preferences, or both, is based on whether the at least two RACH resource allocations are enabled for the UE to transmit the capability information or the repetition preferences, or both.

Figure 7:
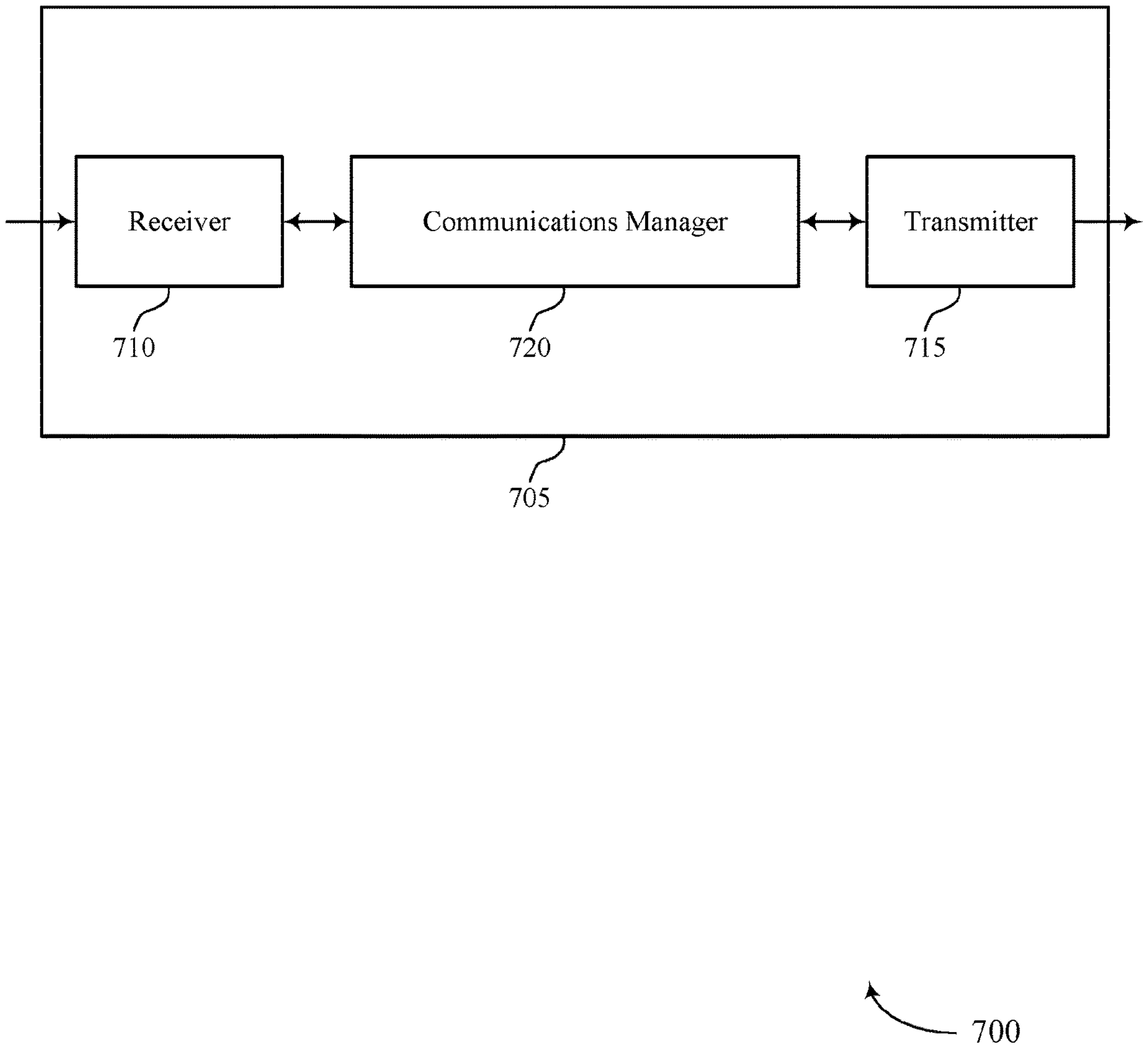
FIGS. 7 and 8 show block diagrams of devices that support RACH resource configuration for different capability UEs in accordance with aspects of the present disclosure.

FIG. 7 shows a block diagram 700 of a device 705 that supports RACH resource configuration for different capability UEs in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to RACH resource configuration for different capability UEs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to RACH resource configuration for different capability UEs). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of RACH resource configuration for different capability UEs as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving, from a base station, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level. The communications manager 720 may be configured as or otherwise support a means for identifying whether either of the at least two RACH resource allocations is enabled for use by the UE to transmit capability information or repetition preferences, or both, associated with a capability of the UE. The communications manager 720 may be configured as or otherwise support a means for transmitting random access signaling over one or more of the at least two overlapping RACH resource allocations, where whether the random access signaling includes the capability information or repetition preferences, or both, is based on whether the at least two RACH resource allocations are enabled for the UE to transmit the capability information or the repetition preferences, or both.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for more efficient utilization of communication resources.

Figure 8:
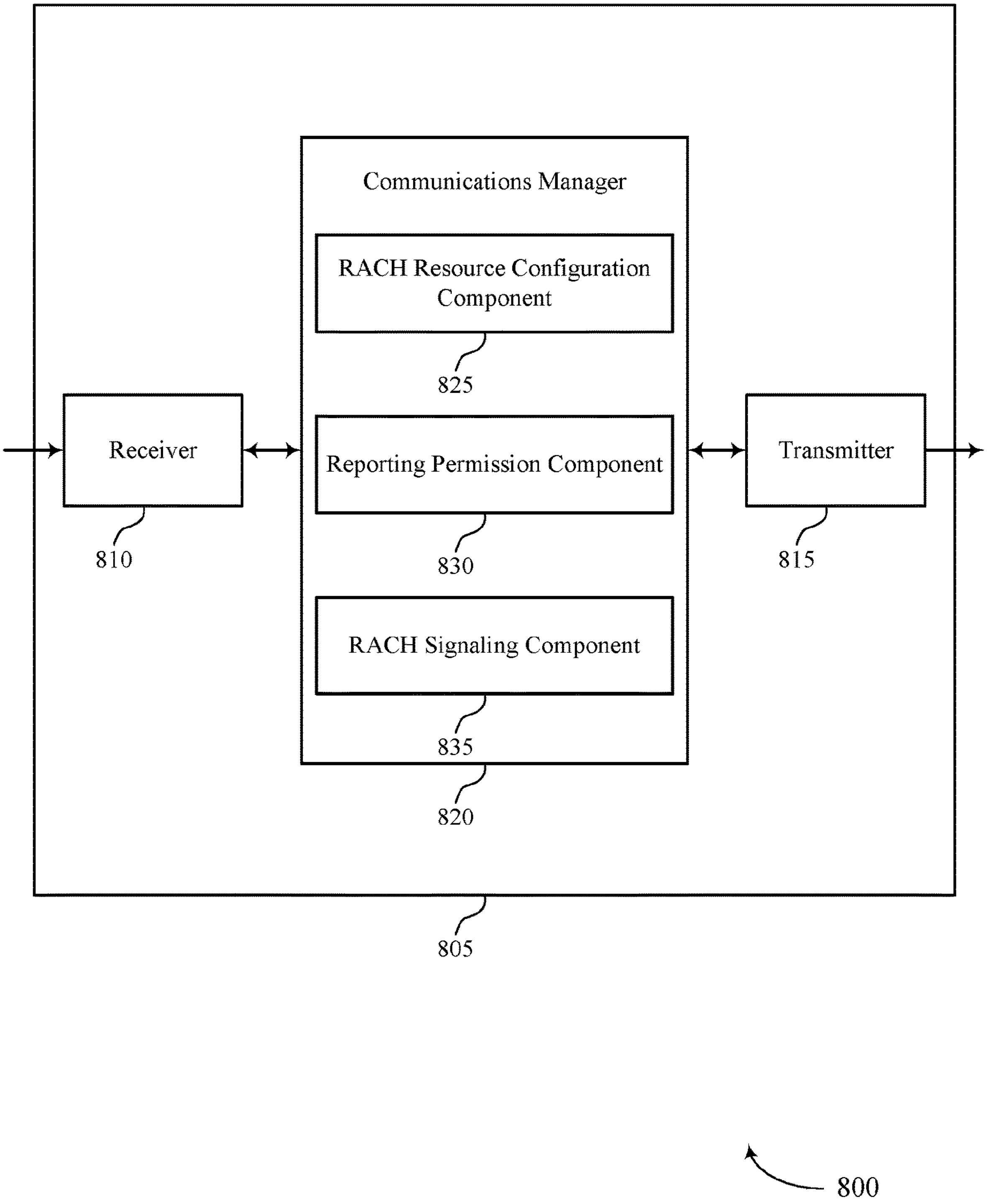

FIG. 8 shows a block diagram 800 of a device 805 that supports RACH resource configuration for different capability UEs in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to RACH resource configuration for different capability UEs). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to RACH resource configuration for different capability UEs). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of RACH resource configuration for different capability UEs as described herein. For example, the communications manager 820 may include a RACH resource configuration component 825, a reporting permission component 830, a RACH signaling component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The RACH resource configuration component 825 may be configured as or otherwise support a means for receiving, from a base station, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level. The reporting permission component 830 may be configured as or otherwise support a means for identifying whether either of the at least two RACH resource allocations is enabled for use by the UE to transmit capability information or repetition preferences, or both, associated with a capability of the UE. The RACH signaling component 835 may be configured as or otherwise support a means for transmitting random access signaling over one or more of the at least two overlapping RACH resource allocations, where whether the random access signaling includes the capability information or repetition preferences, or both, is based on whether the at least two RACH resource allocations are enabled for the UE to transmit the capability information or the repetition preferences, or both.

Figure 9:
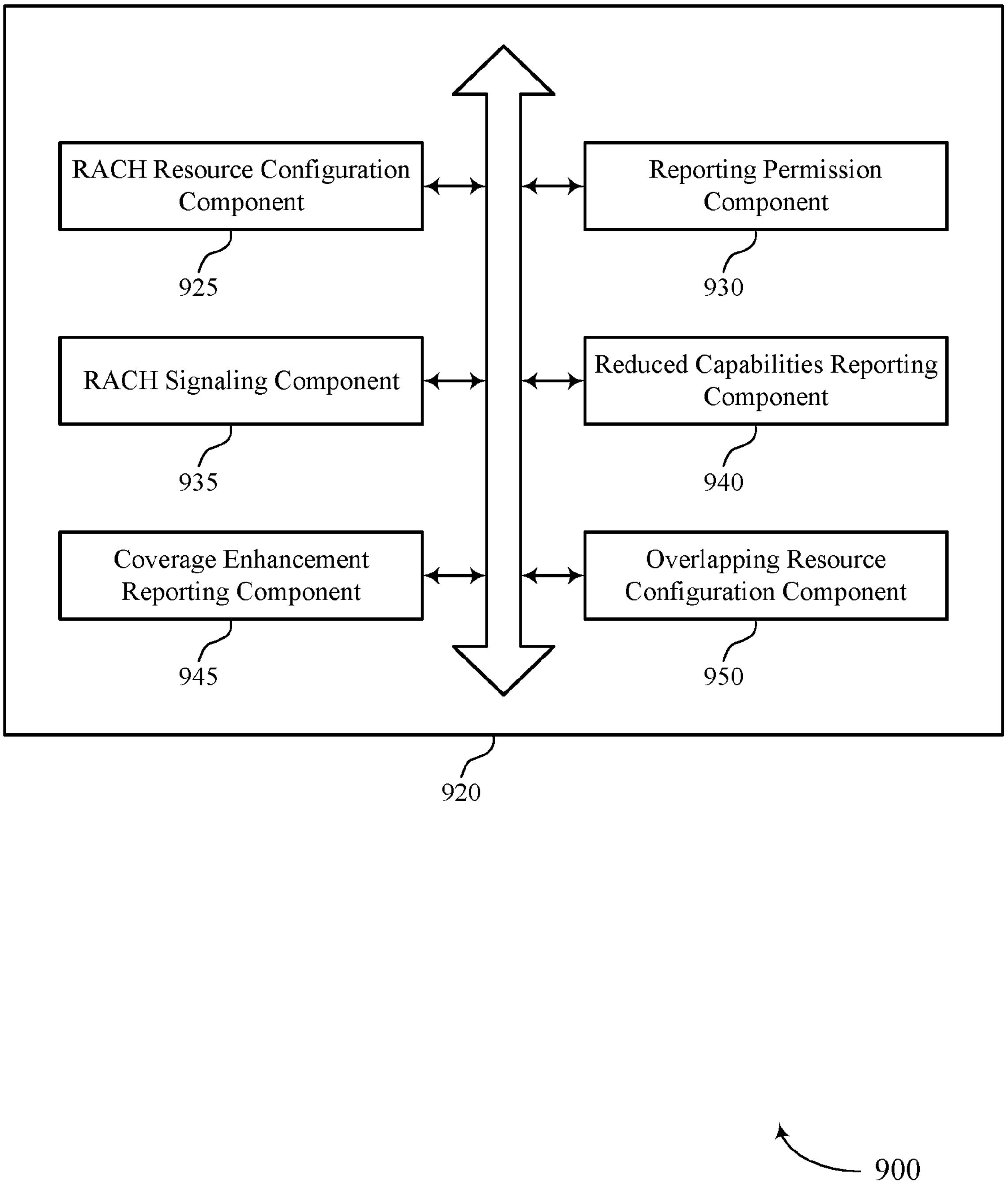
FIG. 9 shows a block diagram of a communications manager that supports RACH resource configuration for different capability UEs in accordance with aspects of the present disclosure.

FIG. 9 shows a block diagram 900 of a communications manager 920 that supports RACH resource configuration for different capability UEs in accordance with aspects of the present disclosure. The communications manager 920 may be an example of aspects of a communications manager 720, a communications manager 820, or both, as described herein. The communications manager 920, or various components thereof, may be an example of means for performing various aspects of RACH resource configuration for different capability UEs as described herein. For example, the communications manager 920 may include a RACH resource configuration component 925, a reporting permission component 930, a RACH signaling component 935, a reduced capabilities reporting component 940, a coverage enhancement reporting component 945, an overlapping resource configuration component 950, or any combination thereof. Each of these components may communicate, directly or indirectly, with one another (e.g., via one or more buses).

The communications manager 920 may support wireless communications at a UE in accordance with examples as disclosed herein. The RACH resource configuration component 925 may be configured as or otherwise support a means for receiving, from a base station, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level. The reporting permission component 930 may be configured as or otherwise support a means for identifying whether either of the at least two RACH resource allocations is enabled for use by the UE to transmit capability information or repetition preferences, or both, associated with a capability of the UE. The RACH signaling component 935 may be configured as or otherwise support a means for transmitting random access signaling over one or more of the at least two overlapping RACH resource allocations, where whether the random access signaling includes the capability information or repetition preferences, or both, is based on whether the at least two RACH resource allocations are enabled for the UE to transmit the capability information or the repetition preferences, or both.

In some examples, the reduced capabilities reporting component 940 may be configured as or otherwise support a means for receiving an indication enabling the second RACH resource allocation associated with the first capability level, where the capability of the UE is the first capability level, and where the first capability level is a reduced capability UE capability level.

In some examples, the reduced capabilities reporting component 940 may be configured as or otherwise support a means for identifying the overlapping portion of allocations is a partial overlap between the first RACH resource allocation associated with the basic UE capability level and the second RACH resource allocation associated with the reduced capability UE capability level, where the random access signaling is transmitted on a non-overlapping portion of the second RACH resource allocation and includes the capability information.

In some examples, the reduced capabilities reporting component 940 may be configured as or otherwise support a means for identifying the overlapping portion of allocations is a partial overlap between the third RACH resource allocation associated with the second capability level or repetition preferences, or both, and the second RACH resource allocation associated with the reduced capability UE capability level.

In some examples, the reduced capabilities reporting component 940 may be configured as or otherwise support a means for transmitting the random access signaling including the capability information on the overlapping portion based on the overlapping portion being enabled for reduced capability UE capability reporting.

In some examples, the reduced capabilities reporting component 940 may be configured as or otherwise support a means for transmitting the random access signaling including the capability information on a non-overlapping portion of the second RACH resource allocation for associated with the reduced capability UE capability level based on the overlapping portion being disabled for reduced capability UE capability reporting.

In some examples, the reduced capabilities reporting component 940 may be configured as or otherwise support a means for identifying the overlapping portion of allocations based on the third RACH resource allocation associated with the second capability level or repetition preferences, or both, being a subset of the second RACH resource allocation associated with the reduced UE capability level. In some examples, the reduced capabilities reporting component 940 may be configured as or otherwise support a means for transmitting the random access signaling including the capability information on a non-overlapping portion of the second RACH resource allocation associated with the reduced capability UE capability level based on the third RACH resource allocation being enabled for capability information or repetition preferences reporting for the second capability level or repetition preferences, or both.

In some examples, the reduced capabilities reporting component 940 may be configured as or otherwise support a means for identifying the overlapping portion of allocations based on the third RACH resource allocation associated with the second capability level or repetition preferences, or both, being a subset of the second RACH resource allocation associated with the reduced capability UE capability level. In some examples, the reduced capabilities reporting component 940 may be configured as or otherwise support a means for transmitting the random access signaling including the capability information on a non-overlapping portion of the second RACH resource allocation associated with the reduced capability UE capability level or on the overlapping portion based on the third RACH resource allocation being disabled for capability information or repetition preference reporting for the second capability level.

In some examples, the RACH resource configuration component 925 may be configured as or otherwise support a means for receiving an indication enabling the third RACH resource allocation associated with the second capability level or repetition preferences, or both, where the second RACH resource allocation at least partially overlaps the third RACH resource allocation, the UE is associated with the second capability level or repetition preferences, or both, and the second capability level is a coverage enhancement UE capability level or repetition preferences level, or both.

In some examples, to support transmitting the random access signaling, the RACH resource configuration component 925 may be configured as or otherwise support a means for transmitting the random access signaling including the capability information or the repetition preferences, or both, associated with the coverage enhancement UE capability level or repetition preferences level, or both, based on the second RACH resource allocation associated with the reduced capability UE capability level being a subset of the third RACH resource allocation associated with the coverage enhancement UE capability level or repetition preferences level, or both.

In some examples, to support transmitting the random access signaling, the RACH resource configuration component 925 may be configured as or otherwise support a means for transmitting the random access signaling including the capability information associated with the reduced capability UE capability level based on the third RACH resource allocation associated with the coverage enhancement UE capability level or repetition preferences level, or both, being a subset of the second RACH resource allocation associated with the reduced capability UE capability level.

In some examples, to support transmitting the random access signaling, the reduced capabilities reporting component 940 may be configured as or otherwise support a means for transmitting the random access signaling to indicate the capability information including a reduced bandwidth capability, a reduced receive antenna number capability, a reduced receiver antenna gain capability, a reduced number of receive chain capability, a reduced HARQ processing capability, a reduced CSI processing capability, a reduced beam measurement or reporting capability, a half-duplex frequency division duplexing capability, or any combination thereof.

In some examples, the reduced capabilities reporting component 940 may be configured as or otherwise support a means for identifying that capability reporting associated with the first capability level is disabled for the second RACH resource allocation, where the random access signaling is transmitted without the capability information.

In some examples, the reduced capabilities reporting component 940 may be configured as or otherwise support a means for receiving, from the base station, an indication that the capability reporting associated with the first capability level is disabled.

In some examples, to support identifying, the reduced capabilities reporting component 940 may be configured as or otherwise support a means for identifying the second RACH resource allocation associated with the first capability level is a subset of the first RACH resource allocation associated with the basic UE capability level.

In some examples, to support identifying, the reduced capabilities reporting component 940 may be configured as or otherwise support a means for identifying the second RACH resource allocation associated with the first capability level is a subset of the third RACH resource allocation associated with the second capability level or repetition preferences, or both.

In some examples, the coverage enhancement reporting component 945 may be configured as or otherwise support a means for receiving an indication enabling the third RACH resource allocation associated with the second capability level or repetition preferences, or both, where the UE is associated with the second capability level or repetition preferences, or both, and where the second capability level is a coverage enhancement UE capability level or repetition preferences level, or both.

In some examples, the coverage enhancement reporting component 945 may be configured as or otherwise support a means for identifying the overlapping portion of allocations is a partial overlap between the first RACH resource allocation associated with the basic UE capability level and the third RACH resource allocation associated with the coverage enhancement UE capability level or repetition preferences level, or both, where the random access signaling is transmitted on a non-overlapping portion of the third RACH resource allocation and includes the capability information or the repetition preferences, or both.

In some examples, the coverage enhancement reporting component 945 may be configured as or otherwise support a means for identifying the overlapping portion of allocations is a partial overlap between the third RACH resource allocation associated with the coverage enhancement UE capability level or repetition preferences level, or both, and the second RACH resource allocation associated with the first capability level.

In some examples, the coverage enhancement reporting component 945 may be configured as or otherwise support a means for transmitting the random access signaling including the capability information or repetition preferences, or both, on the overlapping portion based on the overlapping portion being enabled for coverage enhancement UE reporting or repetition preferences reporting, or both.

In some examples, the coverage enhancement reporting component 945 may be configured as or otherwise support a means for transmitting the random access signaling including the capability information or repetition preferences, or both, on a non-overlapping portion of the third RACH resource allocation for associated with the coverage enhancement UE capability level or repetition preferences level, or both, based on the overlapping portion being disabled for coverage enhancement UE capability reporting or repetition preferences reporting, or both.

In some examples, the coverage enhancement reporting component 945 may be configured as or otherwise support a means for identifying the overlapping portion of allocations based on the second RACH resource allocation associated with the first capability level being a subset of the third RACH resource allocation associated with the coverage enhancement capability level. In some examples, the coverage enhancement reporting component 945 may be configured as or otherwise support a means for transmitting the random access signaling including the capability information or the repetition preferences, or both, on a non-overlapping portion of the third RACH resource allocation associated with the coverage enhancement UE capability level or repetition preferences level, or both, based on the second RACH resource allocation associated with the first capability level being enabled for capability reporting.

In some examples, the coverage enhancement reporting component 945 may be configured as or otherwise support a means for identifying the overlapping portion of allocations based on the second RACH resource allocation associated with the first capability level being a subset of the third RACH resource allocation associated with the coverage enhancement UE capability level or repetition preferences level, or both. In some examples, the coverage enhancement reporting component 945 may be configured as or otherwise support a means for transmitting the random access signaling including the capability information or repetition preferences, or both, on a non-overlapping portion of the third RACH resource allocation associated with the coverage enhancement UE capability level or repetition preferences level, or both, or on the overlapping portion based on the second RACH resource allocation being disabled for capability reporting or repetition preferences reporting, or both.

In some examples, to support transmitting the random access signaling, the coverage enhancement reporting component 945 may be configured as or otherwise support a means for transmitting the random access signaling indicating the capability information or repetition preferences, or both, including one or more of a message 2 PDCCH or PDSCH repetition capability, a message 2 PDCCH or PDSCH repetition preference, a message 2 PDCCH or PDSCH repetition number preference, a message 3 PUSCH repetition capability, a message 3 PUSCH repetition preference, a message 3 PUSCH repetition number preference, a message 4 PDCCH, PDSCH or PUCCH repetition capability, a message 4 PDCCH, PDSCH or PUCCH repetition preference, or a message 4 PDCCH, PDSCH or PUCCH repetition number preference.

In some examples, the coverage enhancement reporting component 945 may be configured as or otherwise support a means for identifying that the capability information and the repetition preference reporting associated with the second capability level or repetition preferences level, or both, is disabled for the third RACH resource allocation, where the random access signaling is transmitted without the capability information or the repetition preferences.

In some examples, the coverage enhancement reporting component 945 may be configured as or otherwise support a means for receiving, from the base station, an indication that capability or preference reporting associated with the second capability level or repetition preferences level, or both, is disabled.

In some examples, to support identifying, the coverage enhancement reporting component 945 may be configured as or otherwise support a means for identifying the third RACH resource allocation associated with the second capability level or repetition preferences level, or both, is a subset of the first RACH resource allocation associated with the basic UE capability level.

In some examples, to support identifying, the coverage enhancement reporting component 945 may be configured as or otherwise support a means for identifying the third RACH resource allocation associated with the second capability level or repetition preferences level, or both, is a subset of the second RACH resource allocation associated with the first capability level.

In some examples, to support receiving the control signaling, the overlapping resource configuration component 950 may be configured as or otherwise support a means for receiving an indication of a first set of RACH occasions for a first of the at least two RACH resource allocations and a second set of RACH occasions for a second of the at least two RACH resource allocations, where the first set of RACH occasions and the second set of RACH occasions include one or more common RACH occasions.

In some examples, to support receiving the control signaling, the overlapping resource configuration component 950 may be configured as or otherwise support a means for receiving an indication of a first set of RACH preambles for a first of the at least two RACH resource allocations and a second set of RACH preambles for a second of the at least two RACH resource allocations, where the first set of RACH preambles and the second set of RACH preambles include one or more common RACH occasions.

Figure 10:
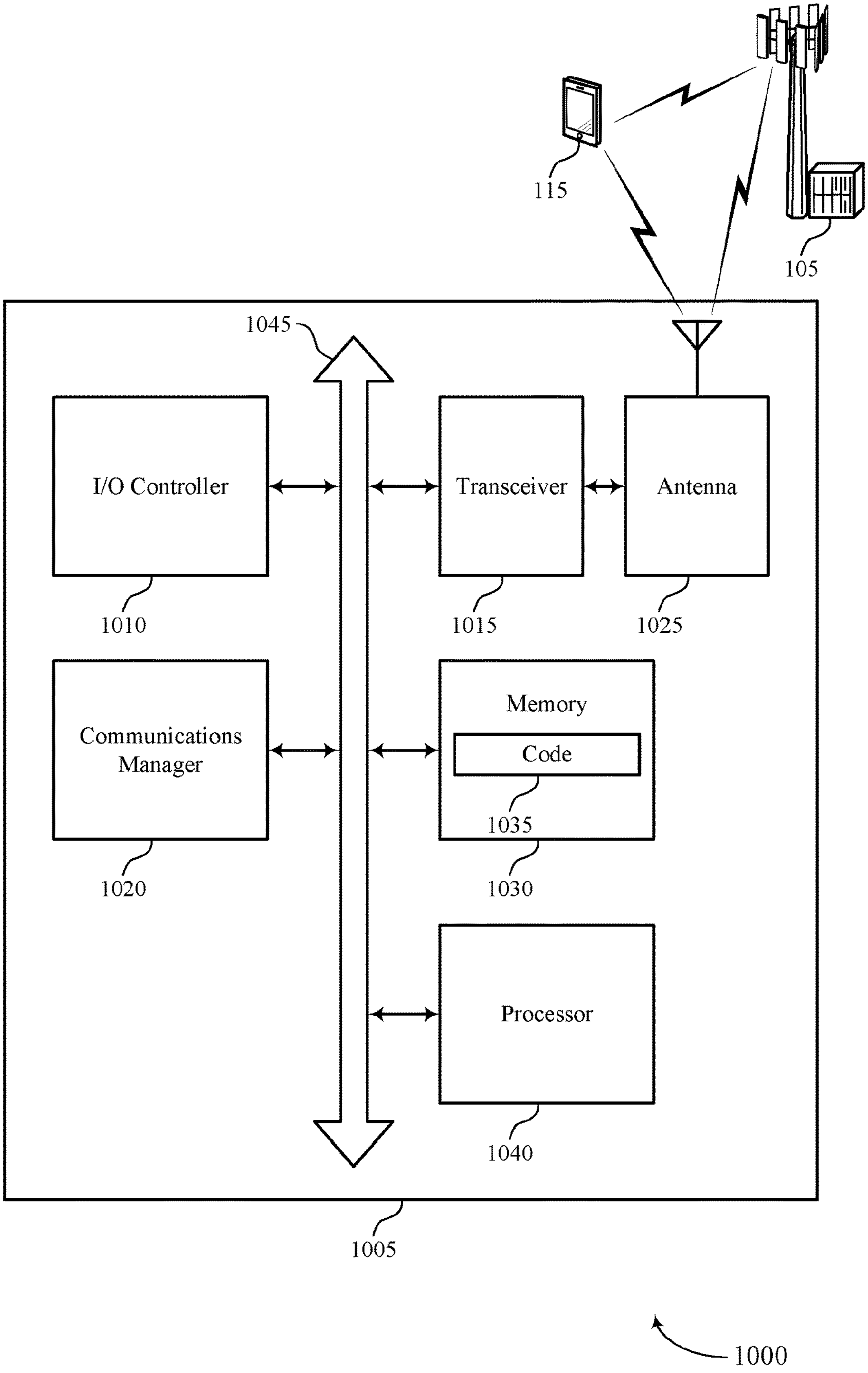
FIG. 10 shows a diagram of a system including a device that supports RACH resource configuration for different capability UEs in accordance with aspects of the present disclosure.

FIG. 10 shows a diagram of a system 1000 including a device 1005 that supports RACH resource configuration for different capability UEs in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting RACH resource configuration for different capability UEs). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving, from a base station, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level. The communications manager 1020 may be configured as or otherwise support a means for identifying whether either of the at least two RACH resource allocations is enabled for use by the UE to transmit capability information or repetition preferences, or both, associated with a capability of the UE. The communications manager 1020 may be configured as or otherwise support a means for transmitting random access signaling over one or more of the at least two overlapping RACH resource allocations, where whether the random access signaling includes the capability information or repetition preferences, or both, is based on whether the at least two RACH resource allocations are enabled for the UE to transmit the capability information or the repetition preferences, or both.

By including or configuring the communications manager 1020 in accordance with examples as described herein, the device 1005 may support techniques for more efficient utilization of communication resources.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of RACH resource configuration for different capability UEs as described herein, or the processor 1040 and the memory 1030 may be otherwise configured to perform or support such operations.

Figure 11:
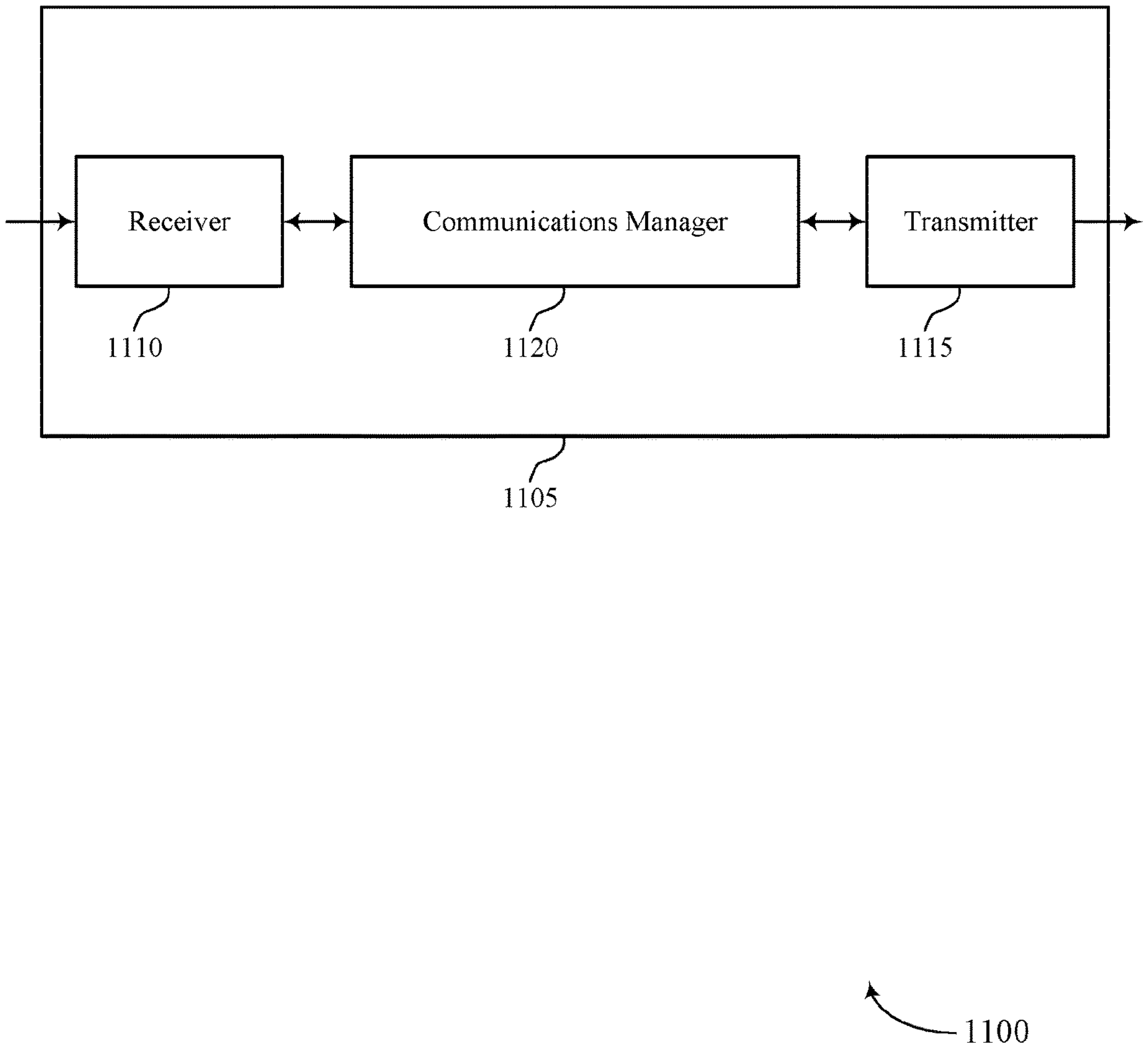
FIGS. 11 and 12 show block diagrams of devices that support RACH resource configuration for different capability UEs in accordance with aspects of the present disclosure.

FIG. 11 shows a block diagram 1100 of a device 1105 that supports RACH resource configuration for different capability UEs in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to RACH resource configuration for different capability UEs). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to RACH resource configuration for different capability UEs). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of RACH resource configuration for different capability UEs as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting, to a UE, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level. The communications manager 1120 may be configured as or otherwise support a means for identifying whether either of the at least two RACH resource allocations is enabled for use by the UE to transmit capability information or repetition preferences, or both, associated with a capability of the UE. The communications manager 1120 may be configured as or otherwise support a means for receiving random access signaling over one or more of the at least two overlapping RACH resource allocations, where whether the random access signaling includes the capability information or repetition preferences, or both, is based on whether the at least two RACH resource allocations are enabled for the UE to transmit capability information or repetition preferences, or both.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for more efficient utilization of communication resources.

Figure 12:
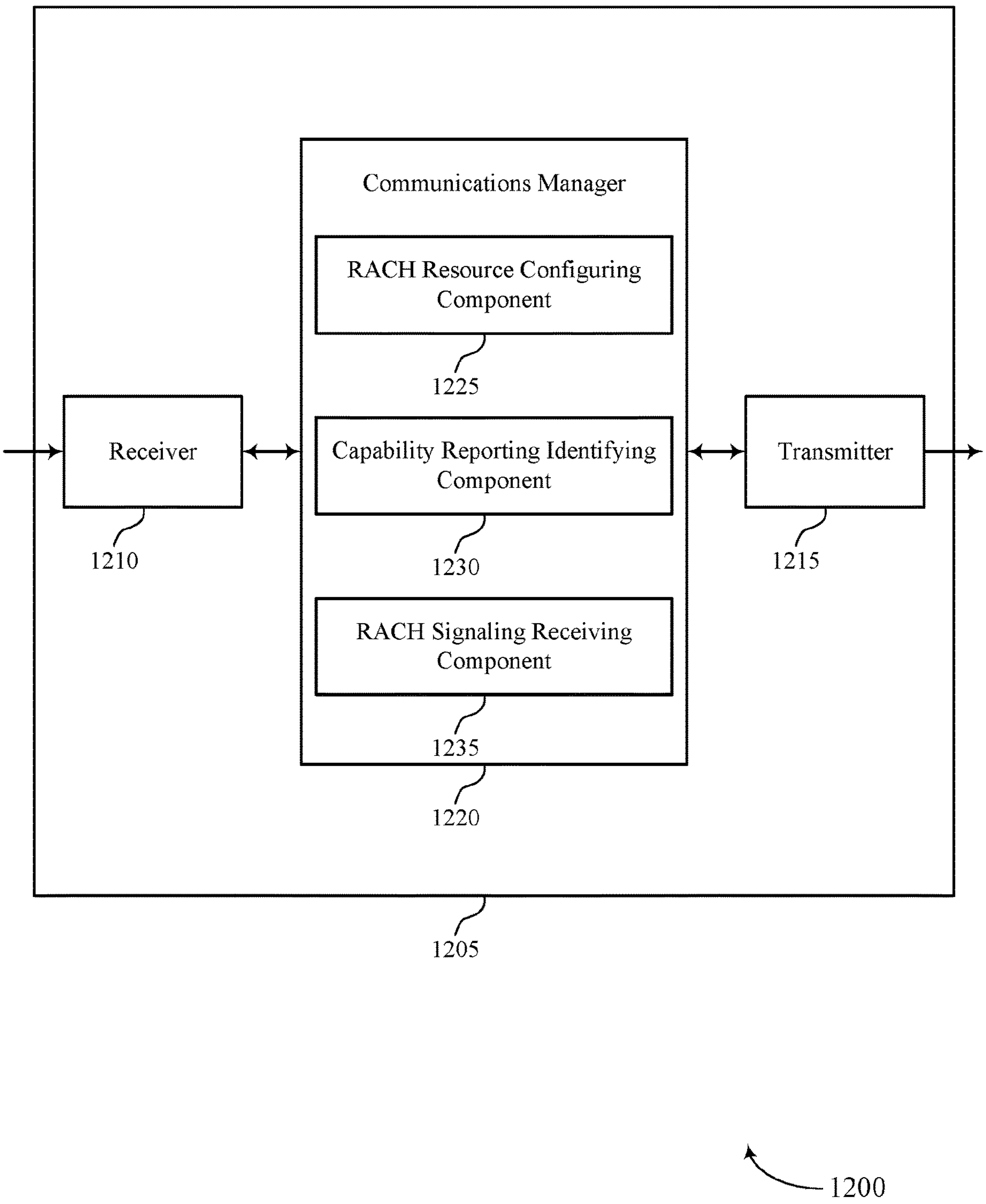

FIG. 12 shows a block diagram 1200 of a device 1205 that supports RACH resource configuration for different capability UEs in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to RACH resource configuration for different capability UEs). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to RACH resource configuration for different capability UEs). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of RACH resource configuration for different capability UEs as described herein. For example, the communications manager 1220 may include a RACH resource configuring component 1225, a capability reporting identifying component 1230, a RACH signaling receiving component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The RACH resource configuring component 1225 may be configured as or otherwise support a means for transmitting, to a UE, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level. The capability reporting identifying component 1230 may be configured as or otherwise support a means for identifying whether either of the at least two RACH resource allocations is enabled for use by the UE to transmit capability information or repetition preferences, or both, associated with a capability of the UE. The RACH signaling receiving component 1235 may be configured as or otherwise support a means for receiving random access signaling over one or more of the at least two overlapping RACH resource allocations, where whether the random access signaling includes the capability information or repetition preferences, or both, is based on whether the at least two RACH resource allocations are enabled for the UE to transmit capability information or repetition preferences, or both.

Figure 13:
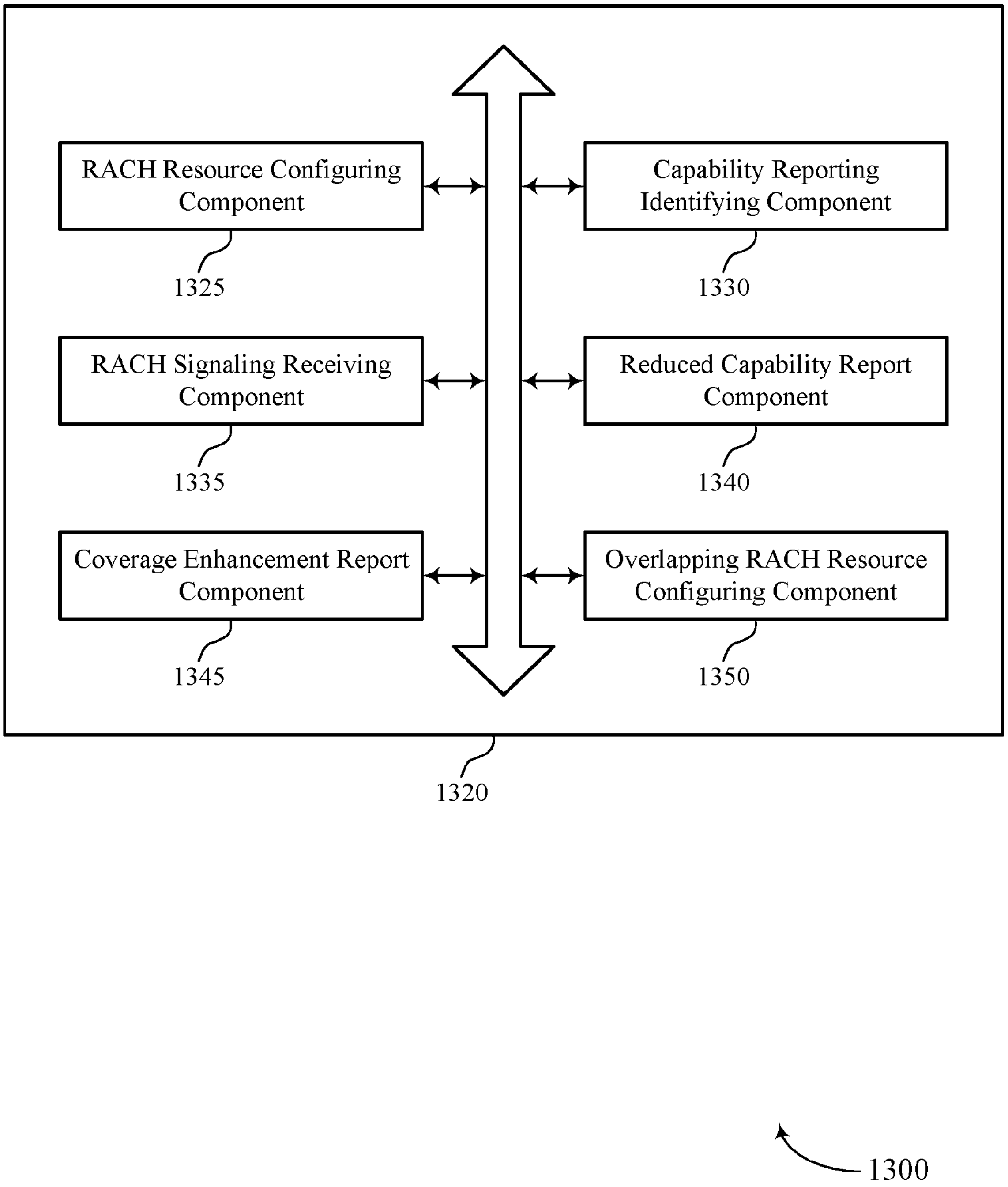
FIG. 13 shows a block diagram of a communications manager that supports RACH resource configuration for different capability UEs in accordance with aspects of the present disclosure.

FIG. 13 shows a block diagram 1300 of a communications manager 1320 that supports RACH resource configuration for different capability UEs in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of RACH resource configuration for different capability UEs as described herein. For example, the communications manager 1320 may include a RACH resource configuring component 1325, a capability reporting identifying component 1330, a RACH signaling receiving component 1335, a reduced capability report component 1340, a coverage enhancement report component 1345, an overlapping RACH resource configuring component 1350, or any combination thereof. Each of these components may communicate, directly or indirectly, with one another (e.g., via one or more buses).

The communications manager 1320 may support wireless communications at a base station in accordance with examples as disclosed herein. The RACH resource configuring component 1325 may be configured as or otherwise support a means for transmitting, to a UE, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level. The capability reporting identifying component 1330 may be configured as or otherwise support a means for identifying whether either of the at least two RACH resource allocations is enabled for use by the UE to transmit capability information or repetition preferences, or both, associated with a capability of the UE. The RACH signaling receiving component 1335 may be configured as or otherwise support a means for receiving random access signaling over one or more of the at least two overlapping RACH resource allocations, where whether the random access signaling includes the capability information or repetition preferences, or both, is based on whether the at least two RACH resource allocations are enabled for the UE to transmit capability information or repetition preferences, or both.

In some examples, the reduced capability report component 1340 may be configured as or otherwise support a means for transmitting an indication enabling the second RACH resource allocation associated with the first capability level, where the capability of the UE is the first capability level, and where the first capability level is a reduced capability UE capability level.

In some examples, the reduced capability report component 1340 may be configured as or otherwise support a means for identifying the overlapping portion of allocations is a partial overlap between the first RACH resource allocation associated with the basic UE capability level and the second RACH resource allocation associated with the reduced capability UE capability level, where the random access signaling is received on a non-overlapping portion of the second RACH resource allocation and includes the capability information.

In some examples, the reduced capability report component 1340 may be configured as or otherwise support a means for identifying the overlapping portion of allocations is a partial overlap between the third RACH resource allocation associated with the second capability level or repetition preferences, or both, and the second RACH resource allocation associated with the reduced capability UE capability level.

In some examples, the reduced capability report component 1340 may be configured as or otherwise support a means for receiving the random access signaling including the capability information on the overlapping portion based on the overlapping portion being enabled for reduced capability UE capability reporting.

In some examples, the reduced capability report component 1340 may be configured as or otherwise support a means for receiving the random access signaling including the capability information on a non-overlapping portion of the second RACH resource allocation for associated with the reduced capability UE capability level based on the overlapping portion being disabled for reduced capability UE capability reporting.

In some examples, the reduced capability report component 1340 may be configured as or otherwise support a means for identifying the overlapping portion of allocations based on the third RACH resource allocation associated with the second capability level or repetition preferences, or both, being a subset of the second RACH resource allocation associated with the reduced UE capability level. In some examples, the reduced capability report component 1340 may be configured as or otherwise support a means for receiving the random access signaling including the capability information on a non-overlapping portion of the second RACH resource allocation associated with the reduced capability UE capability level based on the third RACH resource allocation being enabled for capability information or repetition preferences reporting for the second capability level or repetition preferences, or both.

In some examples, the reduced capability report component 1340 may be configured as or otherwise support a means for identifying the overlapping portion of allocations based on the third RACH resource allocation associated with the second capability level or repetition preferences, or both, being a subset of the second RACH resource allocation associated with the reduced capability UE capability level. In some examples, the reduced capability report component 1340 may be configured as or otherwise support a means for receiving the random access signaling including the capability information on a non-overlapping portion of the second RACH resource allocation associated with the reduced capability UE capability level or on the overlapping portion based on the third RACH resource allocation being disabled for capability information or repetition preference reporting for the second capability level or repetition preferences, or both.

In some examples, the RACH resource configuring component 1325 may be configured as or otherwise support a means for transmitting an indication enabling the third RACH resource allocation associated with the second capability level or repetition preferences, or both, where the second RACH resource allocation at least partially overlaps the third RACH resource allocation, the UE is associated with the second capability level or repetition preferences, or both, and the second capability level is a coverage enhancement UE capability level or repetition preferences level, or both.

In some examples, to support receiving the random access signaling, the RACH resource configuring component 1325 may be configured as or otherwise support a means for receiving the random access signaling including the capability information or the repetition preferences, or both, associated with the coverage enhancement UE capability level or repetition preferences level, or both, based on the second RACH resource allocation associated with the reduced capability UE capability level being a subset of the third RACH resource allocation associated with the coverage enhancement UE capability level or repetition preferences level, or both.

In some examples, to support receiving the random access signaling, the RACH resource configuring component 1325 may be configured as or otherwise support a means for receiving the random access signaling including the capability information associated with the reduced capability UE capability level based on the third RACH resource allocation associated with the coverage enhancement UE capability level or repetition preferences level, or both, being a subset of the second RACH resource allocation associated with the reduced capability UE capability level.

In some examples, to support receiving the random access signaling, the reduced capability report component 1340 may be configured as or otherwise support a means for receiving the random access signaling indicating the capability information including a reduced bandwidth capability, a reduced receive antenna number capability, a reduced receiver antenna gain capability, a reduced number of receive chain capability, a reduced HARQ processing capability, a reduced CSI processing capability, a reduced beam measurement or reporting capability, a half-duplex frequency division duplexing capability, or any combination thereof.

In some examples, the reduced capability report component 1340 may be configured as or otherwise support a means for identifying that capability reporting associated with the first capability level is disabled for the second RACH resource allocation, where the random access signaling is received without the capability information.

In some examples, the reduced capability report component 1340 may be configured as or otherwise support a means for transmitting, to the UE, an indication that the capability reporting associated with the first capability level is disabled.

In some examples, to support identifying, the reduced capability report component 1340 may be configured as or otherwise support a means for identifying the second RACH resource allocation associated with the first capability level is a subset of the first RACH resource allocation associated with the basic UE capability level.

In some examples, to support identifying, the reduced capability report component 1340 may be configured as or otherwise support a means for identifying the second RACH resource allocation associated with the first capability level is a subset of the third RACH resource allocation associated with the second capability level or repetition preferences, or both.

In some examples, the coverage enhancement report component 1345 may be configured as or otherwise support a means for transmitting an indication enabling the third RACH resource allocation associated with the second capability level, where the capability of the UE is the second capability level, and where the second capability level is a coverage enhancement UE capability level or repetition preferences level, or both.

In some examples, the coverage enhancement report component 1345 may be configured as or otherwise support a means for identifying the overlapping portion of allocations is a partial overlap between the first RACH resource allocation associated with the basic UE capability level and the third RACH resource allocation associated with the coverage enhancement UE capability level or repetition preferences level, or both, where the random access signaling is received on a non-overlapping portion of the third RACH resource allocation and includes the capability information or the repetition preferences, or both.

In some examples, the coverage enhancement report component 1345 may be configured as or otherwise support a means for identifying the overlapping portion of allocations is a partial overlap between the third RACH resource allocation associated with the coverage enhancement UE capability level or repetition preferences level, or both, and the second RACH resource allocation associated with the first capability level.

In some examples, the coverage enhancement report component 1345 may be configured as or otherwise support a means for receiving the random access signaling including the capability information or repetition preferences, or both, on the overlapping portion based on the overlapping portion being enabled for coverage enhancement UE reporting or repetition preferences reporting, or both.

In some examples, the coverage enhancement report component 1345 may be configured as or otherwise support a means for receiving the random access signaling indicating the capability information or repetition preferences, or both, on a non-overlapping portion of the third RACH resource allocation for associated with the coverage enhancement UE capability level or repetition preferences level, or both, based on the overlapping portion being disabled for coverage enhancement UE capability reporting or repetition preferences reporting, or both.

In some examples, the coverage enhancement report component 1345 may be configured as or otherwise support a means for identifying the overlapping portion of allocations based on the second RACH resource allocation associated with the first capability level being a subset of the third RACH resource allocation associated with the coverage enhancement capability level. In some examples, the coverage enhancement report component 1345 may be configured as or otherwise support a means for receiving the random access signaling including the capability information or the repetition preferences, or both, on a non-overlapping portion of the third RACH resource allocation associated with the coverage enhancement UE capability level or repetition preferences reporting, or both, based on the second RACH resource allocation associated with the first capability level being enabled for capability reporting.

In some examples, the coverage enhancement report component 1345 may be configured as or otherwise support a means for identifying the overlapping portion of allocations based on the second RACH resource allocation associated with the first capability level being a subset of the third RACH resource allocation associated with the coverage enhancement UE capability level or repetition preferences reporting, or both. In some examples, the coverage enhancement report component 1345 may be configured as or otherwise support a means for receiving the random access signaling including the capability information or the repetition preferences, or both, on a non-overlapping portion of the third RACH resource allocation associated with the coverage enhancement UE capability level or repetition preferences reporting, or both, or on the overlapping portion based on the second RACH resource allocation being disabled for capability reporting or repetition preferences reporting, or both.

In some examples, to support transmitting the random access signaling, the coverage enhancement report component 1345 may be configured as or otherwise support a means for receiving the random access signaling indicating the capability information or repetition preferences, or both, including one or more of a message 2 repetition capability, a message 2 repetition preference, a message 2 repetition number, a message 3 repetition capability, a message 3 repetition preference, a message 3 repetition number, a message 4 repetition capability, a message 4 repetition preference, or a message 4 repetition number.

In some examples, the coverage enhancement report component 1345 may be configured as or otherwise support a means for identifying that the capability information and the repetition preference reporting associated with the second capability level is disabled for the third RACH resource allocation, where the random access signaling is received without the capability information or the repetition preferences.

In some examples, the coverage enhancement report component 1345 may be configured as or otherwise support a means for transmitting, to the UE, an indication that capability or repetition preference reporting associated with the second capability level is disabled.

In some examples, to support identifying, the coverage enhancement report component 1345 may be configured as or otherwise support a means for identifying the third RACH resource allocation associated with the second capability level is a subset of the first RACH resource allocation associated with the basic UE capability level. In some examples, to support identifying, the coverage enhancement report component 1345 may be configured as or otherwise support a means for identifying the third RACH resource allocation associated with the second capability level is a subset of the second RACH resource allocation associated with the first capability level.

In some examples, to support transmitting the control signaling, the overlapping RACH resource configuring component 1350 may be configured as or otherwise support a means for transmitting an indication of a first set of RACH occasions for a first of the at least two RACH resource allocations and a second set of RACH occasions for a second of the at least two RACH resource allocations, where the first set of RACH occasions and the second set of RACH occasions include one or more common RACH occasions.

In some examples, to support transmitting the control signaling, the overlapping RACH resource configuring component 1350 may be configured as or otherwise support a means for transmitting an indication of a first set of RACH preambles for a first of the at least two RACH resource allocations and a second set of RACH preambles for a second of the at least two RACH resource allocations, where the first set of RACH preambles and the second set of RACH preambles include one or more common RACH occasions.

Figure 14:
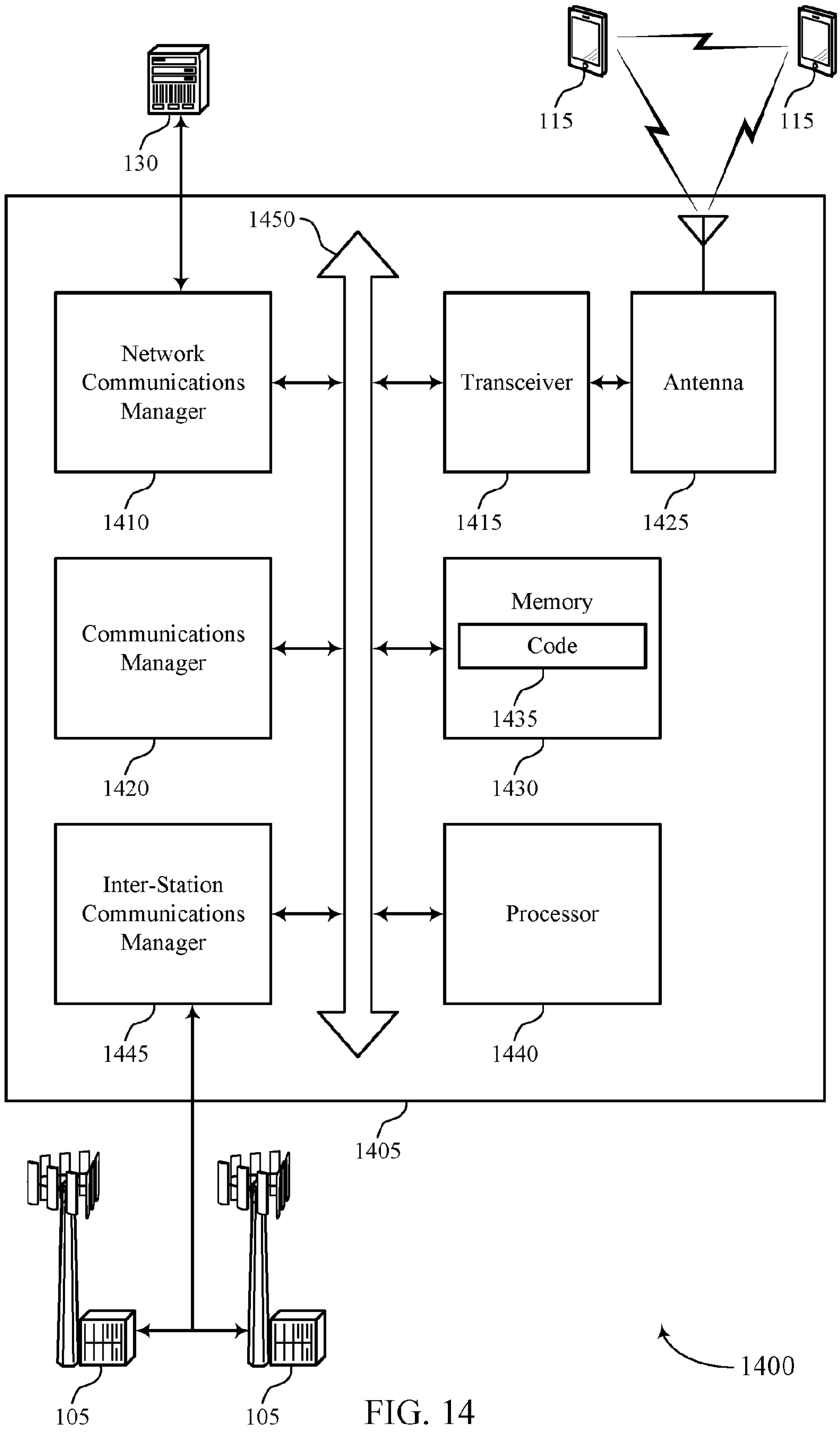
FIG. 14 shows a diagram of a system including a device that supports RACH resource configuration for different capability UEs in accordance with aspects of the present disclosure.

FIG. 14 shows a diagram of a system 1400 including a device 1405 that supports RACH resource configuration for different capability UEs in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting RACH resource configuration for different capability UEs). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting, to a UE, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level. The communications manager 1420 may be configured as or otherwise support a means for identifying whether either of the at least two RACH resource allocations is enabled for use by the UE to transmit capability information or repetition preferences, or both, associated with a capability of the UE. The communications manager 1420 may be configured as or otherwise support a means for receiving random access signaling over one or more of the at least two overlapping RACH resource allocations, where whether the random access signaling includes the capability information or repetition preferences, or both, is based on whether the at least two RACH resource allocations are enabled for the UE to transmit capability information or repetition preferences, or both.

By including or configuring the communications manager 1420 in accordance with examples as described herein, the device 1405 may support techniques for more efficient utilization of communication resources.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of RACH resource configuration for different capability UEs as described herein, or the processor 1440 and the memory 1430 may be otherwise configured to perform or support such operations.

Figure 15:
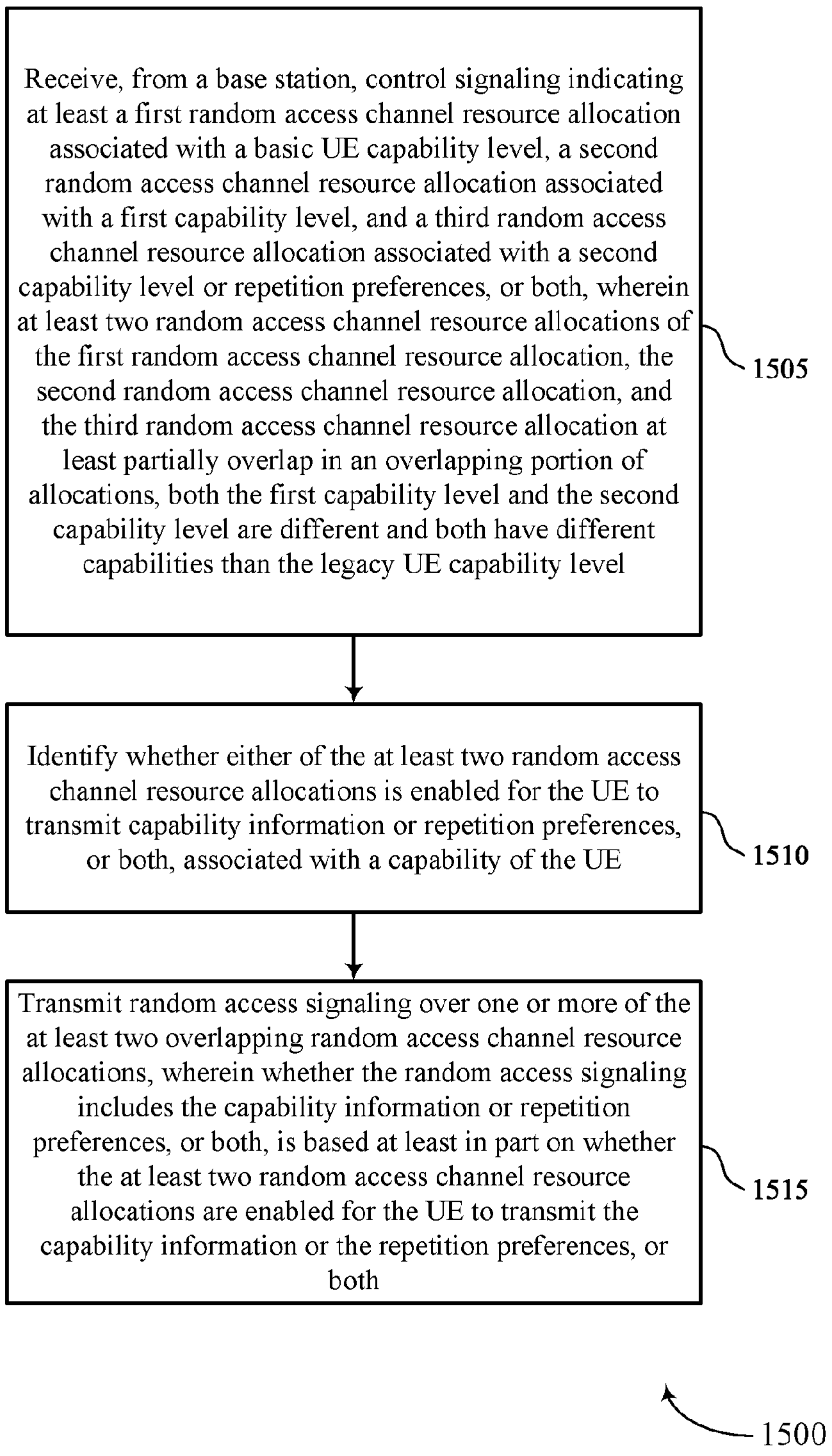
FIGS. 15 through 18 show flowcharts illustrating methods that support RACH resource configuration for different capability UEs in accordance with aspects of the present disclosure.

FIG. 15 shows a flowchart illustrating a method 1500 that supports RACH resource configuration for different capability UEs in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level. The operations of 1505 may be performed in accordance with examples as disclosed herein. In some examples, aspects of the operations of 1505 may be performed by a RACH resource configuration component 925 as described with reference to FIG. 9.

At 1510, the method may include identifying whether either of the at least two RACH resource allocations is enabled for use by the UE to transmit capability information or repetition preferences, or both, associated with a capability of the UE. The operations of 1510 may be performed in accordance with examples as disclosed herein. In some examples, aspects of the operations of 1510 may be performed by a reporting permission component 930 as described with reference to FIG. 9.

At 1515, the method may include transmitting random access signaling over one or more of the at least two overlapping RACH resource allocations, where whether the random access signaling includes the capability information or repetition preferences, or both, is based on whether the at least two RACH resource allocations are enabled for the UE to transmit the capability information or the repetition preferences, or both. The operations of 1515 may be performed in accordance with examples as disclosed herein. In some examples, aspects of the operations of 1515 may be performed by a RACH signaling component 935 as described with reference to FIG. 9.

Figure 16:
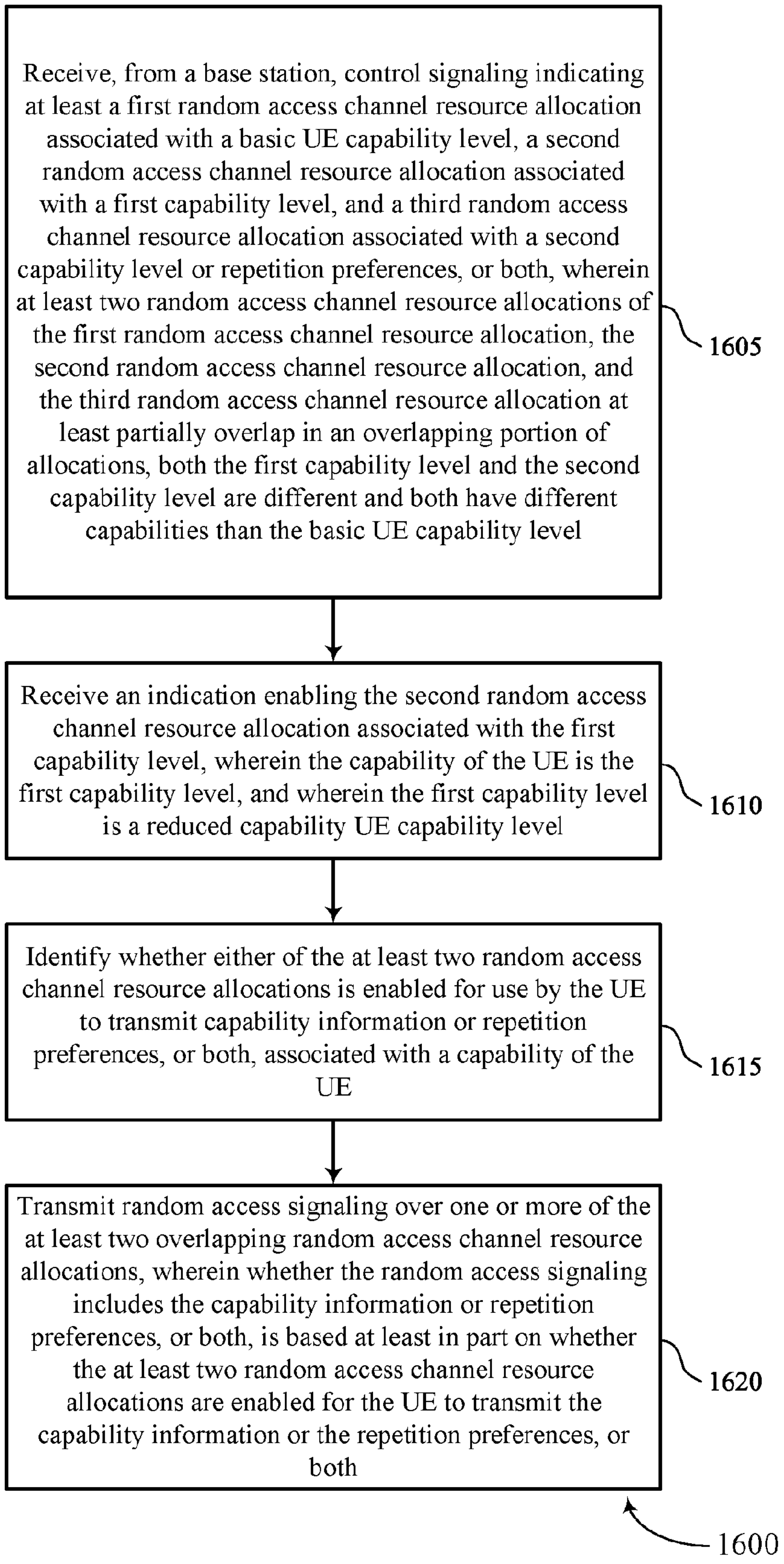

FIG. 16 shows a flowchart illustrating a method 1600 that supports RACH resource configuration for different capability UEs in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level. The operations of 1605 may be performed in accordance with examples as disclosed herein. In some examples, aspects of the operations of 1605 may be performed by a RACH resource configuration component 925 as described with reference to FIG. 9.

At 1610, the method may include receiving an indication enabling the second RACH resource allocation associated with the first capability level, where the capability of the UE is the first capability level, and where the first capability level is a reduced capability UE capability level. The operations of 1610 may be performed in accordance with examples as disclosed herein. In some examples, aspects of the operations of 1610 may be performed by a reduced capabilities reporting component 940 as described with reference to FIG. 9.

At 1615, the method may include identifying whether either of the at least two RACH resource allocations is enabled for use by the UE to transmit capability information or repetition preferences, or both, associated with a capability of the UE. The operations of 1615 may be performed in accordance with examples as disclosed herein. In some examples, aspects of the operations of 1615 may be performed by a reporting permission component 930 as described with reference to FIG. 9.

Figure 17:
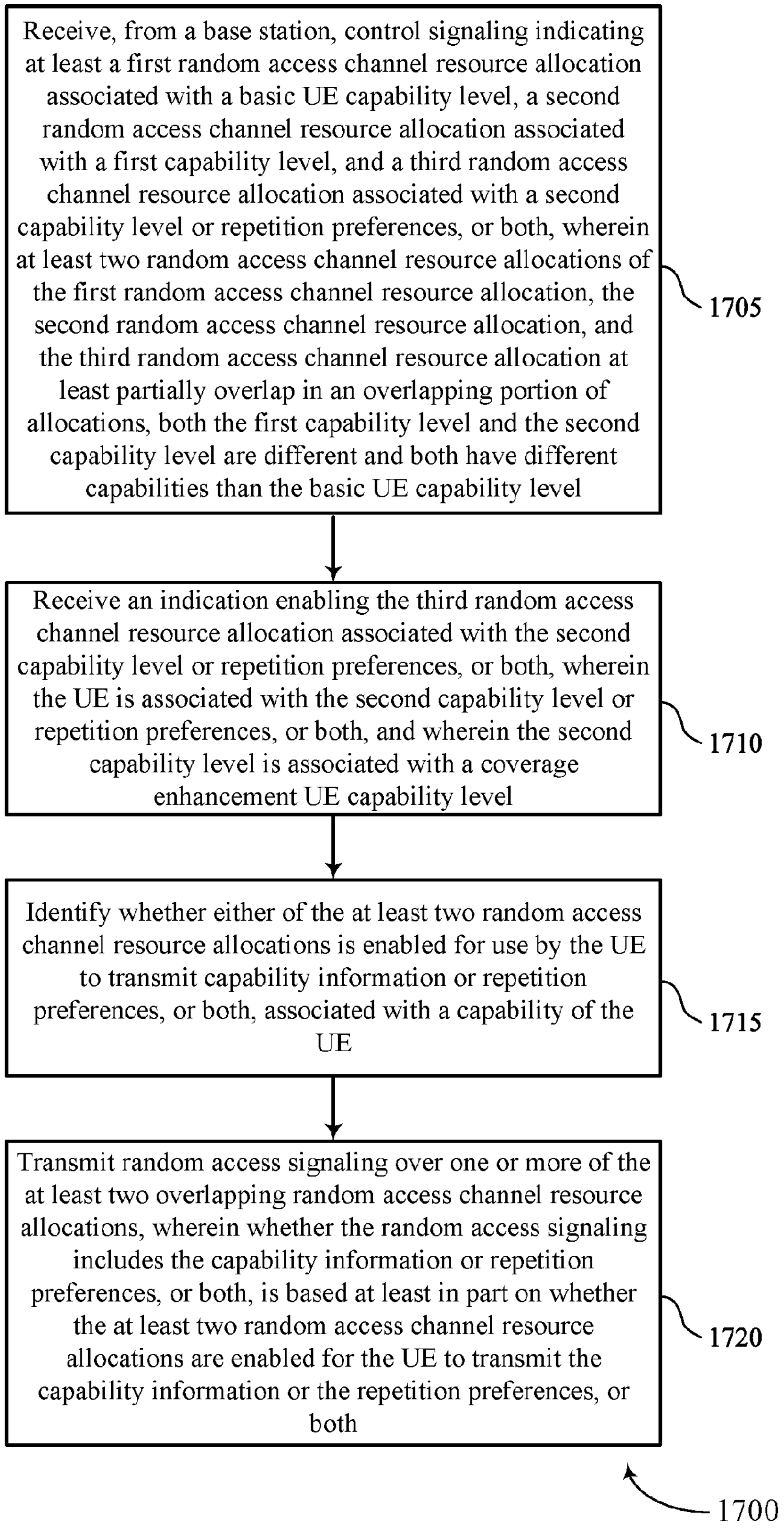

At 1620, the method may include transmitting random access signaling over one or more of the at least two overlapping RACH resource allocations, where whether the random access signaling includes the capability information or repetition preferences, or both, is based on whether the at least two RACH resource allocations are enabled for the UE to transmit the capability information or the repetition preferences, or both. The operations of 1620 may be performed in accordance with examples as disclosed herein. In some examples, aspects of the operations of 1620 may be performed by a RACH signaling component 935 as described with reference to FIG. 9. FIG. 17 shows a flowchart illustrating a method 1700 that supports RACH resource configuration for different capability UEs in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level. The operations of 1705 may be performed in accordance with examples as disclosed herein. In some examples, aspects of the operations of 1705 may be performed by a RACH resource configuration component 925 as described with reference to FIG. 9.

At 1710, the method may include receiving an indication enabling the third RACH resource allocation associated with the second capability level, where the capability of the UE is the second capability level, and where the second capability level is a coverage enhancement UE capability level or repetition preferences level, or both. The operations of 1710 may be performed in accordance with examples as disclosed herein. In some examples, aspects of the operations of 1710 may be performed by a coverage enhancement reporting component 945 as described with reference to FIG. 9.

At 1715, the method may include identifying whether either of the at least two RACH resource allocations is enabled for use by the UE to transmit capability information or repetition preferences, or both, associated with a capability of the UE. The operations of 1715 may be performed in accordance with examples as disclosed herein. In some examples, aspects of the operations of 1715 may be performed by a reporting permission component 930 as described with reference to FIG. 9.

At 1720, the method may include transmitting random access signaling over one or more of the at least two overlapping RACH resource allocations, where whether the random access signaling includes the capability information or repetition preferences, or both, is based on whether the at least two RACH resource allocations are enabled for the UE to transmit the capability information or the repetition preferences, or both. The operations of 1720 may be performed in accordance with examples as disclosed herein. In some examples, aspects of the operations of 1720 may be performed by a RACH signaling component 935 as described with reference to FIG. 9.

Figure 18:
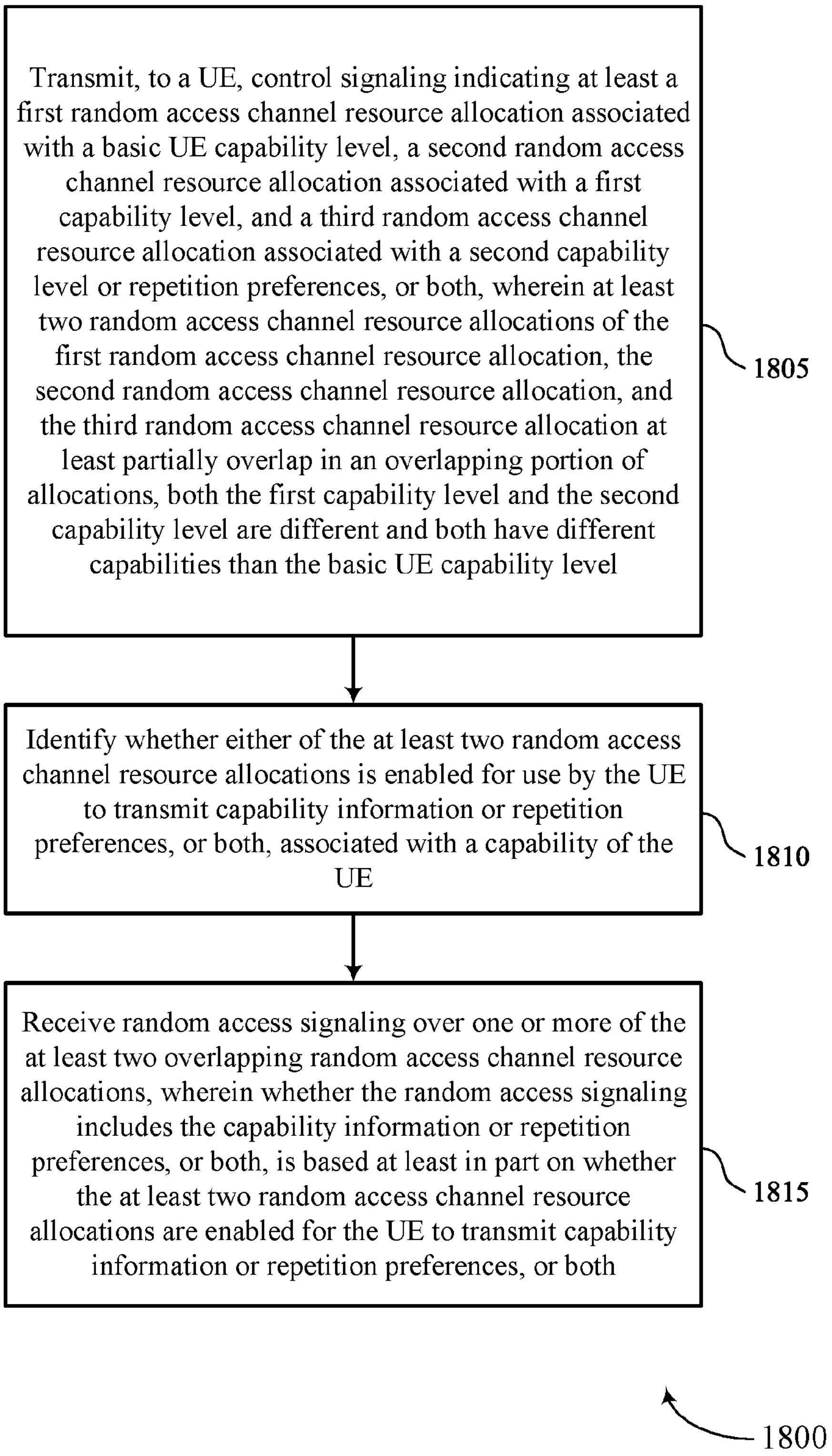

FIG. 18 shows a flowchart illustrating a method 1800 that supports RACH resource configuration for different capability UEs in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, control signaling indicating at least a first RACH resource allocation associated with a basic UE capability level, a second RACH resource allocation associated with a first capability level, and a third RACH resource allocation associated with a second capability level or repetition preferences, or both, where at least two RACH resource allocations of the first RACH resource allocation, the second RACH resource allocation, and the third RACH resource allocation at least partially overlap in an overlapping portion of allocations, both the first capability level and the second capability level are different and both have different capabilities than the basic UE capability level. The operations of 1805 may be performed in accordance with examples as disclosed herein. In some examples, aspects of the operations of 1805 may be performed by a RACH resource configuring component 1325 as described with reference to FIG. 13.

At 1810, the method may include identifying whether either of the at least two RACH resource allocations is enabled for use by the UE to transmit capability information or repetition preferences, or both, associated with a capability of the UE. The operations of 1810 may be performed in accordance with examples as disclosed herein. In some examples, aspects of the operations of 1810 may be performed by a capability reporting identifying component 1330 as described with reference to FIG. 13.

At 1815, the method may include receiving random access signaling over one or more of the at least two overlapping RACH resource allocations, where whether the random access signaling includes the capability information or repetition preferences, or both, is based on whether the at least two RACH resource allocations are enabled for the UE to transmit capability information or repetition preferences, or both. The operations of 1815 may be performed in accordance with examples as disclosed herein. In some examples, aspects of the operations of 1815 may be performed by a RACH signaling receiving component 1335 as described with reference to FIG. 13.

The following provides an overview of aspects of the present disclosure:

Aspect 1: A method for wireless communications at a UE, comprising: receiving, from a base station, control signaling indicating at least a first random access channel resource allocation associated with a basic UE capability level, a second random access channel resource allocation associated with a first capability level, and a third random access channel resource allocation associated with a second capability level or repetition preferences, or both, wherein at least two random access channel resource allocations of the first random access channel resource allocation, the second random access channel resource allocation, and the third random access channel resource allocation at least partially overlap in an overlapping portion of allocations, both the first capability level and the second capability level are different and both have different capabilities than the basic UE capability level; identifying whether either of the at least two random access channel resource allocations is enabled for use by the UE to transmit capability information or repetition preferences, or both, associated with a capability of the UE; and transmitting random access signaling over one or more of the at least two overlapping random access channel resource allocations, wherein whether the random access signaling includes the capability information or repetition preferences, or both, is based at least in part on whether the at least two random access channel resource allocations are enabled for the UE to transmit the capability information or the repetition preferences, or both.

Aspect 2: The method of aspect 1, further comprising: receiving an indication enabling the second random access channel resource allocation associated with the first capability level, wherein the capability of the UE is the first capability level, and wherein the first capability level is a reduced capability UE capability level.

Aspect 3: The method of aspect 2, further comprising: identifying the overlapping portion of allocations is a partial overlap between the first random access channel resource allocation associated with the basic UE capability level and the second random access channel resource allocation associated with the reduced capability UE capability level, wherein the random access signaling is transmitted on a non-overlapping portion of the second random access channel resource allocation and includes the capability information.

Aspect 4: The method of any of aspects 2 through 3, further comprising: identifying the overlapping portion of allocations is a partial overlap between the third random access channel resource allocation associated with the second capability level or repetition preferences, or both, and the second random access channel resource allocation associated with the reduced capability UE capability level.

Aspect 5: The method of aspect 4, further comprising: transmitting the random access signaling including the capability information on the overlapping portion based at least in part on the overlapping portion being enabled for reduced capability UE capability reporting.

Aspect 6: The method of any of aspects 4 through 5, further comprising: transmitting the random access signaling including the capability information on a non-overlapping portion of the second random access channel resource allocation for associated with the reduced capability UE capability level based at least in part on the overlapping portion being disabled for reduced capability UE capability reporting.

Aspect 7: The method of any of aspects 2 through 6, further comprising: identifying the overlapping portion of allocations based at least in part on the third random access channel resource allocation associated with the second capability level or repetition preferences, or both, being a subset of the second random access channel resource allocation associated with the reduced UE capability level; and transmitting the random access signaling including the capability information on a non-overlapping portion of the second random access channel resource allocation associated with the reduced capability UE capability level based at least in part on the third random access channel resource allocation being enabled for capability information or repetition preferences reporting for the second capability level or repetition preferences, or both.

Aspect 8: The method of any of aspects 2 through 7, further comprising: identifying the overlapping portion of allocations based at least in part on the third random access channel resource allocation associated with the second capability level or repetition preferences, or both, being a subset of the second random access channel resource allocation associated with the reduced capability UE capability level; and transmitting the random access signaling including the capability information on a non-overlapping portion of the second random access channel resource allocation associated with the reduced capability UE capability level or on the overlapping portion based at least in part on the third random access channel resource allocation being disabled for capability information or repetition preference reporting for the second capability level or repetition preferences, or both.

Aspect 9: The method of any of aspects 2 through 8, further comprising: receiving an indication enabling the third random access channel resource allocation associated with the second capability level or repetition preferences, or both, wherein the second random access channel resource allocation at least partially overlaps the third random access channel resource allocation, the UE is additionally associated with the second capability level or repetition preferences, or both, and the second capability level or repetition preferences is a coverage enhancement UE capability level or repetition preferences level.

Aspect 10: The method of aspect 9, wherein transmitting the random access signaling comprises: transmitting the random access signaling including the capability information or the repetition preferences, or both, associated with the coverage enhancement UE capability level or repetition preferences level based at least in part on the second random access channel resource allocation associated with the reduced capability UE capability level being a subset of the third random access channel resource allocation associated with the coverage enhancement UE capability level or repetition preferences level.

Aspect 11: The method of any of aspects 9 through 10, wherein transmitting the random access signaling comprises: transmitting the random access signaling including the capability information associated with the reduced capability UE capability level based at least in part on the third random access channel resource allocation associated with the coverage enhancement UE capability level or repetition preferences level being a subset of the second random access channel resource allocation associated with the reduced capability UE capability level.

Aspect 12: The method of any of aspects 2 through 11, wherein transmitting the random access signaling comprises: transmitting the random access signaling to indicate the capability information including a reduced bandwidth capability, a reduced receive antenna number capability, a reduced receiver antenna gain capability, a reduced number of receive chain capability, a reduced HARQ processing capability, a reduced CSI processing capability, a reduced beam measurement or reporting capability, a half-duplex frequency division duplexing capability, or any combination thereof.

Aspect 13: The method of any of aspects 1 through 12, further comprising: identifying that capability reporting associated with the first capability level is disabled for the second random access channel resource allocation, wherein the random access signaling is transmitted without the capability information.

Aspect 14: The method of aspect 13, further comprising: receiving, from the base station, an indication that the capability reporting associated with the first capability level is disabled.

Aspect 15: The method of any of aspects 13 through 14, wherein the identifying comprises: identifying the second random access channel resource allocation associated with the first capability level is a subset of the first random access channel resource allocation associated with the basic UE capability level.

Aspect 16: The method of any of aspects 13 through 15, wherein the identifying comprises: identifying the second random access channel resource allocation associated with the first capability level is a subset of the third random access channel resource allocation associated with the second capability level or repetition preferences, or both.

Aspect 17: The method of any of aspects 1 through 16, further comprising: receiving an indication enabling the third random access channel resource allocation associated with the second capability level or repetition preferences, or both, wherein the UE is associated with the second capability level or repetition preferences, or both, and wherein the second capability level is associated with a coverage enhancement UE capability level or repetition preferences level.

Aspect 18: The method of aspect 17, further comprising: identifying the overlapping portion of allocations is a partial overlap between the first random access channel resource allocation associated with the basic UE capability level and the third random access channel resource allocation associated with the coverage enhancement UE capability level or repetition preferences level, wherein the random access signaling is transmitted on a non-overlapping portion of the third random access channel resource allocation and includes the capability information or the repetition preferences, or both.

Aspect 19: The method of any of aspects 17 through 18, further comprising: identifying the overlapping portion of allocations is a partial overlap between the third random access channel resource allocation associated with the coverage enhancement UE capability level or repetition preferences level and the second random access channel resource allocation associated with the first capability level.

Aspect 20: The method of aspect 19, further comprising: transmitting the random access signaling including the capability information or repetition preferences, or both, on the overlapping portion based at least in part on the overlapping portion being enabled for coverage enhancement UE reporting or repetition preferences reporting.

Aspect 21: The method of any of aspects 19 through 20, further comprising: transmitting the random access signaling including the capability information or repetition preferences, or both, on a non-overlapping portion of the third random access channel resource allocation for associated with the coverage enhancement UE capability level or repetition preferences level based at least in part on the overlapping portion being disabled for coverage enhancement UE capability reporting or repetition preferences reporting.

Aspect 22: The method of any of aspects 17 through 21, further comprising: identifying the overlapping portion of allocations based at least in part on the second random access channel resource allocation associated with the first capability level being a subset of the third random access channel resource allocation associated with the coverage enhancement capability level or repetition preferences level; and transmitting the random access signaling including the capability information or the repetition preferences, or both, on a non-overlapping portion of the third random access channel resource allocation associated with the coverage enhancement UE capability level or repetition preferences level based at least in part on the second random access channel resource allocation associated with the first capability level being enabled for capability reporting.

Aspect 23: The method of any of aspects 17 through 22, further comprising: identifying the overlapping portion of allocations based at least in part on the second random access channel resource allocation associated with the first capability level being a subset of the third random access channel resource allocation associated with the coverage enhancement UE capability level or repetition preferences level; and transmitting the random access signaling including the capability information or repetition preferences, or both, on a non-overlapping portion of the third random access channel resource allocation associated with the coverage enhancement UE capability level or repetition preferences level or on the overlapping portion based at least in part on the second random access channel resource allocation being disabled for capability reporting.

Aspect 24: The method of any of aspects 17 through 23, wherein transmitting the random access signaling comprises: transmitting the random access signaling indicating the capability information or repetition preferences, or both, including one or more of a message 2 PDCCH or PDSCH repetition capability, a message 2 PDCCH or PDSCH repetition preference, a message 2 PDCCH or PDSCH repetition number preference, a message 3 PUSCH repetition capability, a message 3 PUSCH repetition preference, a message 3 PUSCH repetition number preference, a message 4 PDCCH or PDSCH or PUCCH repetition capability, a message 4 PDCCH or PDSCH or PUCCH repetition preference, or a message 4 PDCCH or PDSCH or PUCCH repetition number preference.

Aspect 25: The method of any of aspects 1 through 24, further comprising: identifying that the capability information and the repetition preference reporting associated with the second capability level or repetition preferences, or both, is disabled for the third random access channel resource allocation, wherein the random access signaling is transmitted without the capability information or the repetition preferences.

Aspect 26: The method of aspect 25, further comprising: receiving, from the base station, an indication that capability or preference reporting associated with the second capability level or repetition preferences, or both, is disabled.

Aspect 27: The method of any of aspects 25 through 26, wherein the identifying comprises: identifying the third random access channel resource allocation associated with the second capability level or repetition preferences, or both, is a subset of the first random access channel resource allocation associated with the basic UE capability level.

Aspect 28: The method of any of aspects 25 through 27, wherein the identifying comprises: identifying the third random access channel resource allocation associated with the second capability level or repetition preferences, or both, is a subset of the second random access channel resource allocation associated with the first capability level.

Aspect 29: The method of any of aspects 1 through 28, wherein receiving the control signaling comprises: receiving an indication of a first set of random access channel occasions for a first of the at least two random access channel resource allocations and a second set of random access channel occasions for a second of the at least two random access channel resource allocations, wherein the first set of random access channel occasions and the second set of random access channel occasions include one or more common random access channel occasions.

Aspect 30: The method of any of aspects 1 through 29, wherein receiving the control signaling comprises: receiving an indication of a first set of random access channel preambles for a first of the at least two random access channel resource allocations and a second set of random access channel preambles for a second of the at least two random access channel resource allocations, wherein the first set of random access channel preambles and the second set of random access channel preambles include one or more common random access channel occasions.

Aspect 31: The method of any of aspects 1 through 30, wherein the basic UE capability level is associated with UEs that do not report the first capability level or the second capability level or the repetition preferences, or any combination thereof.

Aspect 32: A method for wireless communications at a base station, comprising: transmitting, to a UE, control signaling indicating at least a first random access channel resource allocation associated with a basic UE capability level, a second random access channel resource allocation associated with a first capability level, and a third random access channel resource allocation associated with a second capability level or repetition preferences, or both, wherein at least two random access channel resource allocations of the first random access channel resource allocation, the second random access channel resource allocation, and the third random access channel resource allocation at least partially overlap in an overlapping portion of allocations, both the first capability level and the second capability level are different and both have different capabilities than the basic UE capability level; identifying whether either of the at least two random access channel resource allocations is enabled for use by the UE to transmit capability information or repetition preferences, or both, associated with a capability of the UE; and receiving random access signaling over one or more of the at least two overlapping random access channel resource allocations, wherein whether the random access signaling includes the capability information or repetition preferences, or both, is based at least in part on whether the at least two random access channel resource allocations are enabled for the UE to transmit capability information or repetition preferences, or both.

Aspect 33: The method of aspect 32, further comprising: transmitting an indication enabling the second random access channel resource allocation associated with the first capability level, wherein the capability of the UE is the first capability level, and wherein the first capability level is a reduced capability UE capability level.

Aspect 34: The method of aspect 33, further comprising: identifying the overlapping portion of allocations is a partial overlap between the first random access channel resource allocation associated with the basic UE capability level and the second random access channel resource allocation associated with the reduced capability UE capability level, wherein the random access signaling is received on a non-overlapping portion of the second random access channel resource allocation and includes the capability information.

Aspect 35: The method of any of aspects 33 through 34, further comprising: identifying the overlapping portion of allocations is a partial overlap between the third random access channel resource allocation associated with the second capability level or repetition preferences, or both, and the second random access channel resource allocation associated with the reduced capability UE capability level.

Aspect 36: The method of aspect 35, further comprising: receiving the random access signaling including the capability information on the overlapping portion based at least in part on the overlapping portion being enabled for reduced capability UE capability reporting.

Aspect 37: The method of any of aspects 35 through 36, further comprising: receiving the random access signaling including the capability information on a non-overlapping portion of the second random access channel resource allocation for associated with the reduced capability UE capability level based at least in part on the overlapping portion being disabled for reduced capability UE capability reporting.

Aspect 38: The method of any of aspects 33 through 37, further comprising: identifying the overlapping portion of allocations based at least in part on the third random access channel resource allocation associated with the second capability level or repetition preferences, or both, being a subset of the second random access channel resource allocation associated with the reduced UE capability level; and receiving the random access signaling including the capability information on a non-overlapping portion of the second random access channel resource allocation associated with the reduced capability UE capability level based at least in part on the third random access channel resource allocation being enabled for capability information or repetition preferences reporting for the second capability level or repetition preferences, or both.

Aspect 39: The method of any of aspects 33 through 38, further comprising: identifying the overlapping portion of allocations based at least in part on the third random access channel resource allocation associated with the second capability level or repetition preferences, or both, being a subset of the second random access channel resource allocation associated with the reduced capability UE capability level; and receiving the random access signaling including the capability information on a non-overlapping portion of the second random access channel resource allocation associated with the reduced capability UE capability level or on the overlapping portion based at least in part on the third random access channel resource allocation being disabled for capability information or repetition preference reporting for the second capability level or repetition preferences, or both.

Aspect 40: The method of any of aspects 33 through 39, further comprising: transmitting an indication enabling the third random access channel resource allocation associated with the second capability level or repetition preferences, or both, wherein the second random access channel resource allocation at least partially overlaps the third random access channel resource allocation, the UE is associated with the second capability level or repetition preferences, or both, and the second capability level or repetition preferences is a coverage enhancement UE capability level or repetition preferences level.

Aspect 41: The method of aspect 40, wherein receiving the random access signaling comprises: receiving the random access signaling including the capability information or the repetition preferences, or both, associated with the coverage enhancement UE capability level or repetition preferences level based at least in part on the second random access channel resource allocation associated with the reduced capability UE capability level being a subset of the third random access channel resource allocation associated with the coverage enhancement UE capability level or repetition preferences level.

Aspect 42: The method of any of aspects 40 through 41, wherein receiving the random access signaling comprises: receiving the random access signaling including the capability information associated with the reduced capability UE capability level based at least in part on the third random access channel resource allocation associated with the coverage enhancement UE capability level or repetition preferences level being a subset of the second random access channel resource allocation associated with the reduced capability UE capability level.

Aspect 43: The method of any of aspects 33 through 42, wherein receiving the random access signaling comprises: receiving the random access signaling indicating the capability information including a reduced bandwidth capability, a reduced receive antenna number capability, a reduced receiver antenna gain capability, a reduced number of receive chain capability, a reduced HARQ processing capability, a reduced CSI processing capability, a reduced beam measurement or reporting capability, a half-duplex frequency division duplexing capability, or any combination thereof.

Aspect 44: The method of any of aspects 32 through 43, further comprising: identifying that capability reporting associated with the first capability level is disabled for the second random access channel resource allocation, wherein the random access signaling is received without the capability information.

Aspect 45: The method of aspect 44, further comprising: transmitting, to the UE, an indication that the capability reporting associated with the first capability level is disabled.

Aspect 46: The method of any of aspects 44 through 45, wherein the identifying comprises: identifying the second random access channel resource allocation associated with the first capability level is a subset of the first random access channel resource allocation associated with the basic UE capability level.

Aspect 47: The method of any of aspects 44 through 46, wherein the identifying comprises: identifying the second random access channel resource allocation associated with the first capability level is a subset of the third random access channel resource allocation associated with the second capability level or repetition preferences, or both.

Aspect 48: The method of any of aspects 32 through 47, further comprising: transmitting an indication enabling the third random access channel resource allocation associated with the second capability level or repetition preferences, or both, wherein the capability of the UE is associated with the second capability level or repetition preferences, or both, and wherein the second capability level is a coverage enhancement UE capability level or repetition preferences level.

Aspect 49: The method of aspect 48, further comprising: identifying the overlapping portion of allocations is a partial overlap between the first random access channel resource allocation associated with the basic UE capability level and the third random access channel resource allocation associated with the coverage enhancement UE capability level or repetition preferences level, wherein the random access signaling is received on a non-overlapping portion of the third random access channel resource allocation and includes the capability information or the repetition preferences, or both.

Aspect 50: The method of any of aspects 48 through 49, further comprising: identifying the overlapping portion of allocations is a partial overlap between the third random access channel resource allocation associated with the coverage enhancement UE capability level or repetition preferences level and the second random access channel resource allocation associated with the first capability level.

Aspect 51: The method of aspect 50, further comprising: receiving the random access signaling including the capability information or repetition preferences, or both, on the overlapping portion based at least in part on the overlapping portion being enabled for coverage enhancement UE reporting or repetition preferences reporting.

Aspect 52: The method of any of aspects 50 through 51, further comprising: receiving the random access signaling indicating the capability information or repetition preferences, or both, on a non-overlapping portion of the third random access channel resource allocation for associated with the coverage enhancement UE capability level or repetition preferences level based at least in part on the overlapping portion being disabled for coverage enhancement UE capability reporting or repetition preferences reporting.

Aspect 53: The method of any of aspects 48 through 52, further comprising: identifying the overlapping portion of allocations based at least in part on the second random access channel resource allocation associated with the first capability level being a subset of the third random access channel resource allocation associated with the coverage enhancement capability level or repetition preferences level; and receiving the random access signaling including the capability information or the repetition preferences, or both, on a non-overlapping portion of the third random access channel resource allocation associated with the coverage enhancement UE capability level or repetition preferences level based at least in part on the second random access channel resource allocation associated with the first capability level being enabled for capability reporting.

Aspect 54: The method of any of aspects 48 through 53, further comprising: identifying the overlapping portion of allocations based at least in part on the second random access channel resource allocation associated with the first capability level being a subset of the third random access channel resource allocation associated with the coverage enhancement UE capability level or repetition preferences level; and receiving the random access signaling including the capability information or the repetition preferences, or both, on a non-overlapping portion of the third random access channel resource allocation associated with the coverage enhancement UE capability level or repetition preferences level or on the overlapping portion based at least in part on the second random access channel resource allocation being disabled for capability reporting.

Aspect 55: The method of any of aspects 48 through 54, wherein transmitting the random access signaling comprises: receiving the random access signaling indicating the capability information or repetition preferences, or both, including one or more of a message 2 PDCCH or PDSCH repetition capability, a message 2 PDCCH or PDSCH repetition preference, a message 2 PDCCH/PDSCH repetition number preference, a message 3 PUSCH repetition capability, a message 3 PUSCH repetition preference, a message 3 PUSCH repetition number preference, a message 4 PDCCH or PDSCH or PUCCH repetition capability, a message 4 PDCCH or PDSCH or PUCCH repetition preference, or a message 4 PDCCH or PDSCH or PUCCH repetition number preference.

Aspect 56: The method of any of aspects 32 through 55, further comprising: identifying that the capability information and the repetition preference reporting associated with the second capability level or repetition preferences, or both, is disabled for the third random access channel resource allocation, wherein the random access signaling is received without the capability information or the repetition preferences.

Aspect 57: The method of aspect 56, further comprising: transmitting, to the UE, an indication that capability or preference reporting associated with the second capability level or repetition preferences, or both, is disabled.

Aspect 58: The method of any of aspects 56 through 57, wherein the identifying comprises: identifying the third random access channel resource allocation associated with the second capability level or repetition preferences, or both, is a subset of the first random access channel resource allocation associated with the basic UE capability level.

Aspect 59: The method of any of aspects 56 through 58, wherein the identifying comprises: identifying the third random access channel resource allocation associated with the second capability level or repetition preferences, or both, is a subset of the second random access channel resource allocation associated with the first capability level.

Aspect 60: The method of any of aspects 32 through 59, wherein transmitting the control signaling comprises: transmitting an indication of a first set of random access channel occasions for a first of the at least two random access channel resource allocations and a second set of random access channel occasions for a second of the at least two random access channel resource allocations, wherein the first set of random access channel occasions and the second set of random access channel occasions include one or more common random access channel occasions.

Aspect 61: The method of any of aspects 32 through 60, wherein transmitting the control signaling comprises: transmitting an indication of a first set of random access channel preambles for a first of the at least two random access channel resource allocations and a second set of random access channel preambles for a second of the at least two random access channel resource allocations, wherein the first set of random access channel preambles and the second set of random access channel preambles include one or more common random access channel occasions.

Aspect 62: An apparatus for wireless communications at a UE, comprising a processor; memory coupled with the processor; and instructions stored in the memory and executable by the processor to cause the apparatus to perform a method of any of aspects 1 through 31.

Aspect 63: An apparatus for wireless communications at a UE, comprising at least one means for performing a method of any of aspects 1 through 31.

Aspect 64: A non-transitory computer-readable medium storing code for wireless communications at a UE, the code comprising instructions executable by a processor to perform a method of any of aspects 1 through 31.

Aspect 65: An apparatus for wireless communications at a base station, comprising a processor; memory coupled with the processor; and instructions stored in the memory and executable by the processor to cause the apparatus to perform a method of any of aspects 32 through 61.

Aspect 66: An apparatus for wireless communications at a base station, comprising at least one means for performing a method of any of aspects 32 through 61.

Aspect 67: A non-transitory computer-readable medium storing code for wireless communications at a base station, the code comprising instructions executable by a processor to perform a method of any of aspects 32 through 61.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving, from a base station, control signaling indicating at least a first random access channel resource allocation associated with a basic UE capability level, a second random access channel resource allocation associated with a first capability level, and a third random access channel resource allocation associated with a second capability level or repetition preferences, or both, wherein at least two random access channel resource allocations of the first random access channel resource allocation, the second random access channel resource allocation, and the third random access channel resource allocation at least partially overlap in an overlapping portion of allocations, both the first capability level and the second capability level are different and both have different capabilities than the basic UE capability level;

identifying whether either of the at least two random access channel resource allocations is enabled for use by the UE to transmit capability information or repetition preferences, or both, associated with a capability of the UE; and transmitting random access signaling over one or more of the at least two overlapping random access channel resource allocations, wherein whether the random access signaling includes the capability information or repetition preferences, or both, is based at least in part on whether the at least two random access channel resource allocations are enabled for the UE to transmit the capability information or the repetition preferences, or both.

2. The method of claim 1, further comprising:

receiving an indication enabling the second random access channel resource allocation associated with the first capability level, wherein the capability of the UE is the first capability level, and wherein the first capability level is a reduced capability UE capability level.

3. The method of claim 2, further comprising:

identifying the overlapping portion of allocations is a partial overlap between the first random access channel resource allocation associated with the basic UE capability level and the second random access channel resource allocation associated with the reduced capability UE capability level, wherein the random access signaling is transmitted on a non-overlapping portion of the second random access channel resource allocation and includes the capability information.

4. The method of claim 2, further comprising:

identifying the overlapping portion of allocations is a partial overlap between the third random access channel resource allocation associated with the second capability level or repetition preferences, or both, and the second random access channel resource allocation associated with the reduced capability UE capability level.

5. The method of claim 4, further comprising:

transmitting the random access signaling including the capability information on the overlapping portion based at least in part on the overlapping portion being enabled for reduced capability UE capability reporting.

6. The method of claim 4, further comprising:

transmitting the random access signaling including the capability information on a non-overlapping portion of the second random access channel resource allocation for associated with the reduced capability UE capability level based at least in part on the overlapping portion being disabled for reduced capability UE capability reporting.

7. The method of claim 2, further comprising:

identifying the overlapping portion of allocations based at least in part on the third random access channel resource allocation associated with the second capability level or repetition preferences, or both, being a subset of the second random access channel resource allocation associated with the reduced UE capability level; and transmitting the random access signaling including the capability information on a non-overlapping portion of the second random access channel resource allocation associated with the reduced capability UE capability level based at least in part on the third random access channel resource allocation being enabled for capability information or repetition preferences reporting for the second capability level or repetition preferences, or both.

8. The method of claim 2, further comprising:

identifying the overlapping portion of allocations based at least in part on the third random access channel resource allocation associated with the second capability level or repetition preferences, or both, being a subset of the second random access channel resource allocation associated with the reduced capability UE capability level; and transmitting the random access signaling including the capability information on a non-overlapping portion of the second random access channel resource allocation associated with the reduced capability UE capability level or on the overlapping portion based at least in part on the third random access channel resource allocation being disabled for capability information or repetition preference reporting for the second capability level or repetition preferences, or both.

9. The method of claim 2, further comprising:

receiving an indication enabling the third random access channel resource allocation associated with the second capability level or repetition preferences, or both, wherein the second random access channel resource allocation at least partially overlaps the third random access channel resource allocation, the UE is additionally associated with the second capability level or repetition preferences, or both, and the second capability level or repetition preferences is a coverage enhancement UE capability level or repetition preferences level.

10. The method of claim 9, wherein transmitting the random access signaling comprises:

transmitting the random access signaling including the capability information or the repetition preferences, or both, associated with the coverage enhancement UE capability level or repetition preferences level based at least in part on the second random access channel resource allocation associated with the reduced capability UE capability level being a subset of the third random access channel resource allocation associated with the coverage enhancement UE capability level or repetition preferences level.

11. The method of claim 9, wherein transmitting the random access signaling comprises:

transmitting the random access signaling including the capability information associated with the reduced capability UE capability level based at least in part on the third random access channel resource allocation associated with the coverage enhancement UE capability level or repetition preferences level being a subset of the second random access channel resource allocation associated with the reduced capability UE capability level.

12. The method of claim 2, wherein transmitting the random access signaling comprises:

transmitting the random access signaling to indicate the capability information including a reduced bandwidth capability, a reduced receive antenna number capability, a reduced receiver antenna gain capability, a reduced number of receive chain capability, a reduced hybrid automatic repeat request (HARQ) processing capability, a reduced channel state information (CSI) processing capability, a reduced beam measurement or reporting capability, a half-duplex frequency division duplexing capability, or any combination thereof.

13. The method of claim 1, further comprising:

identifying that capability reporting associated with the first capability level is disabled for the second random access channel resource allocation, wherein the random access signaling is transmitted without the capability information.

14. The method of claim 13, further comprising:

receiving, from the base station, an indication that the capability reporting associated with the first capability level is disabled.

15. The method of claim 13, wherein the identifying comprises:

identifying the second random access channel resource allocation associated with the first capability level is a subset of the first random access channel resource allocation associated with the basic UE capability level.

16. The method of claim 13, wherein the identifying comprises:

identifying the second random access channel resource allocation associated with the first capability level is a subset of the third random access channel resource allocation associated with the second capability level or repetition preferences, or both.

17. The method of claim 1, further comprising:

receiving an indication enabling the third random access channel resource allocation associated with the second capability level or repetition preferences, or both, wherein the UE is associated with the second capability level or repetition preferences, or both, and wherein the second capability level is associated with a coverage enhancement UE capability level or repetition preferences level.

18. The method of claim 17, further comprising:

identifying the overlapping portion of allocations is a partial overlap between the first random access channel resource allocation associated with the basic UE capability level and the third random access channel resource allocation associated with the coverage enhancement UE capability level or repetition preferences level, wherein the random access signaling is transmitted on a non-overlapping portion of the third random access channel resource allocation and includes the capability information or the repetition preferences, or both.

19. The method of claim 17, further comprising:

identifying the overlapping portion of allocations is a partial overlap between the third random access channel resource allocation associated with the coverage enhancement UE capability level or repetition preferences level and the second random access channel resource allocation associated with the first capability level.

20. The method of claim 19, further comprising:

transmitting the random access signaling including the capability information or repetition preferences, or both, on the overlapping portion based at least in part on the overlapping portion being enabled for coverage enhancement UE reporting or repetition preferences reporting.

21. The method of claim 19, further comprising:

transmitting the random access signaling including the capability information or repetition preferences, or both, on a non-overlapping portion of the third random access channel resource allocation for associated with the coverage enhancement UE capability level or repetition preferences level based at least in part on the overlapping portion being disabled for coverage enhancement UE capability reporting or repetition preferences reporting.

22. The method of claim 17, further comprising:

identifying the overlapping portion of allocations based at least in part on the second random access channel resource allocation associated with the first capability level being a subset of the third random access channel resource allocation associated with the coverage enhancement capability level or repetition preferences level; and transmitting the random access signaling including the capability information or the repetition preferences, or both, on a non-overlapping portion of the third random access channel resource allocation associated with the coverage enhancement UE capability level or repetition preferences level based at least in part on the second random access channel resource allocation associated with the first capability level being enabled for capability reporting.

23. The method of claim 17, further comprising:

identifying the overlapping portion of allocations based at least in part on the second random access channel resource allocation associated with the first capability level being a subset of the third random access channel resource allocation associated with the coverage enhancement UE capability level or repetition preferences level; and transmitting the random access signaling including the capability information or repetition preferences, or both, on a non-overlapping portion of the third random access channel resource allocation associated with the coverage enhancement UE capability level or repetition preferences level or on the overlapping portion based at least in part on the second random access channel resource allocation being disabled for capability reporting.

24. The method of claim 17, wherein transmitting the random access signaling comprises:

transmitting the random access signaling indicating the capability information or repetition preferences, or both, including one or more of a message 2 physical downlink control channel (PDCCH) or physical downlink shared channel (PDSCH) repetition capability, a message 2 PDCCH or PDSCH repetition preference, a message 2 PDCCH or PDSCH repetition number preference, a message 3 physical uplink shared channel (PUSCH) repetition capability, a message 3 PUSCH repetition preference, a message 3 PUSCH repetition number preference, a message 4 PDCCH or physical downlink shared channel (PDSCH) or PUCCH repetition capability, a message 4 PDCCH or PDSCH or PUCCH repetition preference, or a message 4 PDCCH or PDSCH or PUCCH repetition number preference.

25. The method of claim 1, further comprising:

identifying that the capability information and the repetition preference reporting associated with the second capability level or repetition preferences, or both, is disabled for the third random access channel resource allocation, wherein the random access signaling is transmitted without the capability information or the repetition preferences.

26. The method of claim 25, further comprising:

receiving, from the base station, an indication that capability or preference reporting associated with the second capability level or repetition preferences, or both, is disabled.

27. The method of claim 25, wherein the identifying comprises:

identifying the third random access channel resource allocation associated with the second capability level or repetition preferences, or both, is a subset of the first random access channel resource allocation associated with the basic UE capability level.

28. An apparatus for wireless communications at a user equipment (UE), comprising:

a processor;

memory coupled with the processor; and instructions stored in the memory and executable by the processor to cause the apparatus to:

receive, from a base station, control signaling indicating at least a first random access channel resource allocation associated with a basic UE capability level, a second random access channel resource allocation associated with a first capability level, and a third random access channel resource allocation associated with a second capability level or repetition preferences, or both, wherein at least two random access channel resource allocations of the first random access channel resource allocation, the second random access channel resource allocation, and the third random access channel resource allocation at least partially overlap in an overlapping portion of allocations, both the first capability level and the second capability level are different and both have different capabilities than the basic UE capability level;

identify whether either of the at least two random access channel resource allocations is enabled for use by the UE to transmit capability information or repetition preferences, or both, associated with a capability of the UE; and transmit random access signaling over one or more of the at least two overlapping random access channel resource allocations, wherein whether the random access signaling includes the capability information or repetition preferences, or both, is based at least in part on whether the at least two random access channel resource allocations are enabled for the UE to transmit the capability information or the repetition preferences, or both.

29. An apparatus for wireless communications at a user equipment (UE), comprising:

means for receiving, from a base station, control signaling indicating at least a first random access channel resource allocation associated with a basic UE capability level, a second random access channel resource allocation associated with a first capability level, and a third random access channel resource allocation associated with a second capability level or repetition preferences, or both, wherein at least two random access channel resource allocations of the first random access channel resource allocation, the second random access channel resource allocation, and the third random access channel resource allocation at least partially overlap in an overlapping portion of allocations, both the first capability level and the second capability level are different and both have different capabilities than the basic UE capability level;

means for identifying whether either of the at least two random access channel resource allocations is enabled for use by the UE to transmit capability information or repetition preferences, or both, associated with a capability of the UE; and means for transmitting random access signaling over one or more of the at least two overlapping random access channel resource allocations, wherein whether the random access signaling includes the capability information or repetition preferences, or both, is based at least in part on whether the at least two random access channel resource allocations are enabled for the UE to transmit the capability information or the repetition preferences, or both.

30. A non-transitory computer-readable medium storing code for wireless communications at a user equipment (UE), the code comprising instructions executable by a processor to:

receive, from a base station, control signaling indicating at least a first random access channel resource allocation associated with a basic UE capability level, a second random access channel resource allocation associated with a first capability level, and a third random access channel resource allocation associated with a second capability level or repetition preferences, or both, wherein at least two random access channel resource allocations of the first random access channel resource allocation, the second random access channel resource allocation, and the third random access channel resource allocation at least partially overlap in an overlapping portion of allocations, both the first capability level and the second capability level are different and both have different capabilities than the basic UE capability level;

identify whether either of the at least two random access channel resource allocations is enabled for use by the UE to transmit capability information or repetition preferences, or both, associated with a capability of the UE; and transmit random access signaling over one or more of the at least two overlapping random access channel resource allocations, wherein whether the random access signaling includes the capability information or repetition preferences, or both, is based at least in part on whether the at least two random access channel resource allocations are enabled for the UE to transmit the capability information or the repetition preferences, or both.

* * * * *